(12) United States Patent
Bugosh

(10) Patent No.: US 7,596,418 B2
(45) Date of Patent: Sep. 29, 2009

(54) FLUVIAL GEOMORPHIC LANDSCAPE DESIGN COMPUTER SOFTWARE

(75) Inventor: Nicholas Bugosh, Fort Collins, CO (US)

(73) Assignee: Carlson Software, Inc., Maysville, KY (US)

( * ) Notice: Subject to any disclaimer, the term of this patent is extended or adjusted under 35 U.S.C. 154(b) by 865 days.

(21) Appl. No.: 10/939,788

(22) Filed: Sep. 13, 2004

(65) Prior Publication Data

US 2005/0058971 A1 Mar. 17, 2005

Related U.S. Application Data

(60) Provisional application No. 60/502,497, filed on Sep. 12, 2003.

(51) Int. Cl.
*G06F 19/00* (2006.01)
(52) U.S. Cl. ............. 700/98; 434/151; 345/419
(58) Field of Classification Search ........ 700/283; 434/151, 152; 345/419, 427, 418; 701/23, 701/50, 213–214
See application file for complete search history.

(56) References Cited

U.S. PATENT DOCUMENTS

| | | | |
|---|---|---|---|
| 4,897,597 A * | 1/1990 | Whitener | 324/693 |
| 6,191,732 B1 * | 2/2001 | Carlson et al. | 342/357.06 |
| 6,226,000 B1 | 5/2001 | Richens et al. | |
| 6,295,066 B1 | 9/2001 | Tanizaki et al. | |
| 6,595,992 B1 * | 7/2003 | Wagner et al. | 606/61 |
| 6,751,540 B2 * | 6/2004 | Keefer et al. | 701/50 |

OTHER PUBLICATIONS

Western Warer Consultants, Inc., Long-term stability of Designed Ephermeral Channels at reclaimed caol mines, Wyoming, May 25, 1993, Page ( Indix and Abstract i).*
Picture of Nicholas Bugosh explaining computerization of GeoFluv in Carlson Natural Regrade to Gale Norton, Secretary of the Interior on Sep. 27, 2004.
Press Release on New Fluvial Geomorphic Approach Oct. 2004.
Flyer (2 Pages)—Carlson Natural Regrade with GeoFluv 2004.
Brochure (12 Pages)—Bureau of Land Management Reclamation and Sustainable Mineral Development Awards Office of Surface Mining Excellence in Surface Coal Mining Reclamation Awards Sep. 27, 2004.

* cited by examiner

*Primary Examiner*—Kidest Bahta
(74) *Attorney, Agent, or Firm*—Sampson & Associates, P.C.

(57) ABSTRACT

A method and system is provided for producing erosionally stable fluvial geomorphic landscape designs in a computer aided design environment. A topography input module is configured to access a three-dimensional model of existing topography of a site, while a data input module is configured to receive climatic and hydrological data associated with the site. A channel geometry module is configured to utilize the three-dimensional model and the data to generate dimensions for one or more proposed ephemeral channels. A design surface module generates a graphical view of a proposed landform at the site using the existing topography, the proposed ephemeral channels, and optionally, various complementary topographic features.

40 Claims, 18 Drawing Sheets

US 7,596,418 B2

FLUVIAL GEOMORPHIC LANDSCAPE DESIGN COMPUTER SOFTWARE

RELATED APPLICATION

This application claims the benefit of U.S. Provisional Application Ser. No. 60/502,497, entitled, Fluvial Geomorphic Landscape Design Computer Software, filed Sep. 12, 2003.

BACKGROUND

1. Technical Field

This invention relates to a computer implemented system and method for creating landscape designs based on fluvial geomorphic principles.

2. Background Information

Throughout this application, various publications, patents and published patent applications are referred to by an identifying citation. The disclosures of the publications, patents and published patent applications referenced in this application are hereby incorporated by reference into the present disclosure.

Traditional landscape design, whether generated manually or using computer aided design software, is generally based on subjective judgment of landscape appearance or a desired land use with little consideration of proper hydrologic function for balanced conveyance of water and sediment from the land surface. Any water and sediment conveyance is typically accomplished through the use of engineered structural controls, such as drains and/or off-site earth material such as rip-rap and other aggregate.

Such structural controls tend to be relatively expensive, and once installed, require long-term maintenance, particularly when used on relatively large scale projects such as civil engineering for residential and commercial real estate, golf courses, ski areas, resorts, parks, highway and municipal construction, mined-land and other mineral resource company reclamation, repair of flood, earthquake, landslide, or otherwise drastically disturbed lands, reclamation of industrial areas to other uses, etc.

Moreover, conventional landscape design is typically based on conveying a single extreme discharge event, conveying only water discharge, and tends to be less than effective at conveying sediment discharges at low Q (water flow).

Such designs often rely on the use of gradient terraces, relatively expensive off-site earth material, such as rip-rap and artificial drain systems such as culverts and down drains, to effect such water discharge. These conventional approaches tend to be relatively expensive, particularly when implemented on steep slopes, and require on-going long term maintenance, which may be particularly disadvantageous when implemented in remote areas. Conventional designs also tend to require relatively large amounts of backfill to reduce slopes, and often result in slopes of minimal diversity, to reduce the variety of vegetation likely to grow successfully at the site, which in turn, tends to adversely affect the aesthetics of the reclaimed site.

Computer systems, such as the SurvCadd™ system available from Carlson™ Software, Inc. (Maysville, Ky.) are capable of creating and displaying three-dimensional computer models of existing landscape topographies, and comparing them to models of desired topographies. These systems create the existing landscape topographies by collecting data from vehicles traversing the site. Moreover, the system disclosed in U.S. Pat. No. 6,191,732, entitled Real-time surveying/earth moving system, and which is fully incorporated by reference herein, provides cut/fill information in real time to facilitate construction of a proposed landscape topography.

The models of desired topographies, however, are generally imported rather than created by these systems.

A need exists for automating the generation of desired landscape topographies, such as for reclamation of mined or otherwise disturbed land, in a manner that provides for erosionally stable, hydrologically balanced designs using on-site materials.

SUMMARY

An aspect of the invention includes a system for producing erosionally stable fluvial geomorphic landscape designs in a computer aided design environment. The system includes a topography input module configured to access a three-dimensional model of existing topography of a site. The system also includes a data input module configured to receive data associated with the site, including drainage density and precipitation data in the range of at least an annual precipitation event to a 50-year recurrence precipitation event, to calculate a discharge value for the discharge of storm water from the site. Additionally the system includes a channel geometry module configured to divide the discharge value by a maximum desired discharge flow velocity to generate cross-sectional dimensions for a plurality of proposed ephemeral channels and ridges disposed therebetween. These cross-sectional dimensions are sufficient to convey discharge in the range of at least an annual precipitation event to a 50-year recurrence precipitation event. Moreover, the cross-sectional dimensions are re-calculated iteratively at locations along the lengths of the channels to reflect incremental increases in watershed area and flow in the downstream direction. The system also includes a design surface module configured to generate plan and elevational views of a proposed landform at the site using the existing topography, the channels, and the ridges. A three-dimensional model of the proposed landform is thus created according to fluvial geomorphic principles and site-specific data.

Another aspect of the invention includes a system for producing erosionally stable fluvial geomorphic landscape designs in a computer aided design environment. This system includes a topography input module configured to access a three-dimensional model of existing topography of a site. A data input module is configured to receive climatic and hydrological data associated with the site. A channel geometry module is configured to utilize the three-dimensional model and the data to generate dimensions for one or more proposed ephemeral channels. A design surface module is configured to generate a graphical view of a proposed landform at the site using the existing topography, and the one or more proposed ephemeral channels.

A further aspect of the invention includes a method for generating erosionally stable fluvial geomorphic landscape designs in a computer aided design environment. The method includes accessing a three dimensional model of an existing topography of a site, and receiving climatic and hydrological data for the site. The method also includes generating dimensions for one or more ephemeral channels using the three-dimensional model and the data, and generating a graphical view of a proposed landform at the site using the existing topography, and the one or more proposed ephemeral channels.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
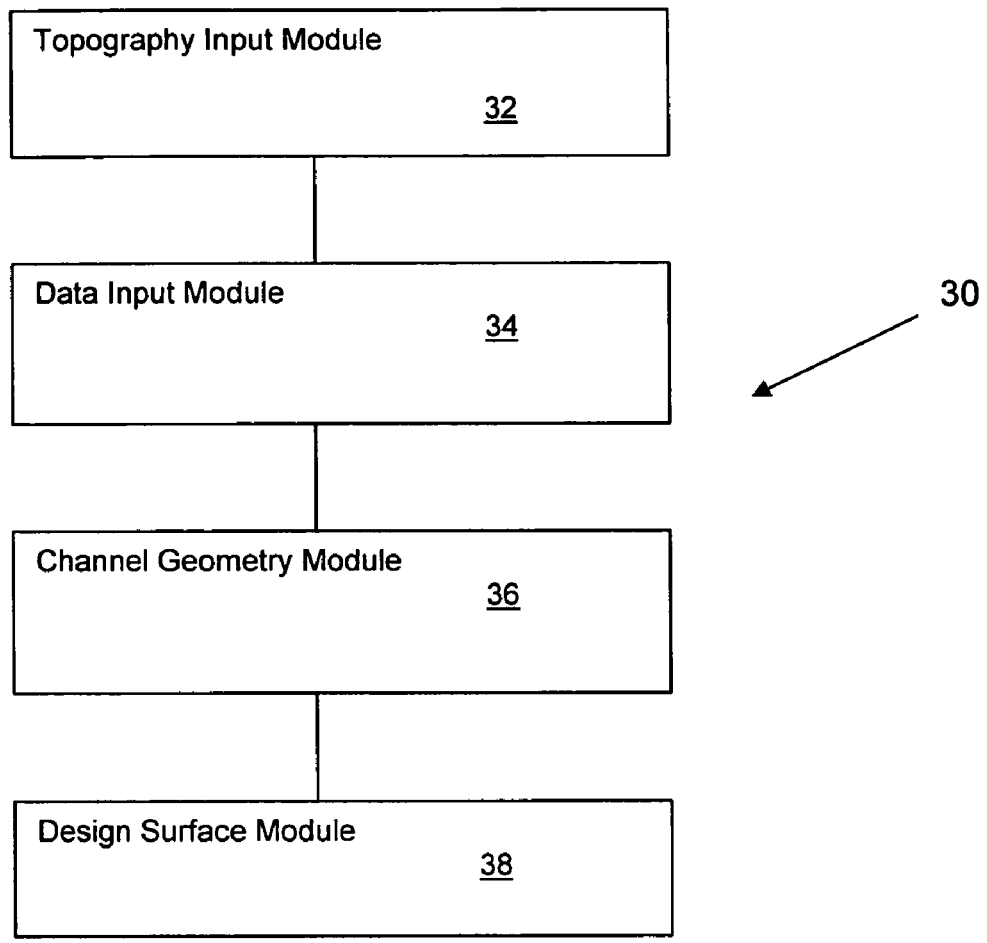
FIG. 1 is a functional block diagram of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Referring to FIG. 1, an exemplary embodiment of the present invention is shown. This embodiment includes a computer aided design system 30 that uses fluvial geomorphic principles to design stable landforms for disturbed sites. This embodiment is based on river and upland hydrologic and geomorphologic research, which extends mathematical relationships that define stream channel geometry to create stable upland landforms. An aspect of the invention was the realization that a given unconsolidated earth material, placed at certain slopes, in a certain climate, will tend to form a certain stable landform over a long period of time.

In this regard, embodiments of the present invention are based on presumptions that:

if the streams have dimensional characteristics that are related to the discharge that they convey, it follows that the dimensional characteristics of the landforms that deliver that discharge to the streams should be related to the channels;

the dimensional characteristics of stable ephemeral channels should be similar to stable perennial channels because they function essentially the same when conveying discharge;

the bankfull event for ephemeral channels is related to an annual precipitation event;

the flood prone area for an ephemeral channel is related to a 50-year recurrence interval event;

ridges and slopes in unconsolidated earth are landforms that divide, collect, and convey discharge to channels and are formed by flowing water between channels; and ridge shapes in unconsolidated material are related to the channel's meandering pattern.

System 30 uses a topography input module 32 to access a three-dimensional model of the existing topography of a particular site or locus. A data input module 34 receives data, such as provided by a user and/or third parties (e.g., via the Internet) to estimate the discharge of storm water from the locus. A Channel Geometry module 36 then divides this discharge value by a maximum desired flow velocity to generate a channel geometry and channel cross-sectional dimensions.

A Design Surface module 38 generates a plan view of the site, using the existing topography acquired by Input Module 32, along with one or more channels having the dimensions discussed above. Module 38 may then generate an appropriate longitudinal (e.g., elevational) profile for the site, using the channel geometries calculated above, and re-calculated iteratively by module 36 to adjust the channel dimensions in the downstream direction so that the channel dimensional characteristics reflect the incremental increases in flow that result from incremental increase in watershed area in the downstream direction. Module 38 may also display main ridgelines and subridges. The result is an idealized draft landform that is created according to fluvial geomorphic principles and site-specific data. The idealized draft landform can then be modified to fit site-specific constraints, e.g., to route a channel around a structure, or to enhance its appearance.

This embodiment is particularly useful in applications, such as strip mining operations, where large tracts of land must be regraded and replanted once the desired minerals are removed. It may advantageously consider a wide range of fluvial discharges, and include simulated natural channel morphology designed to be hydrologically balanced, to adequately convey both water and sediment discharge. The designs are also configured to be built using available on-site materials, which tends to significantly lower costs, particularly on relatively steep slopes. These approaches also provide for natural, self-maintenance, and may be used to reclaim steep slopes, while reducing material moving expenses. Slope aspect diversity is also increased to promote vegetation variety and success, for improved natural beauty. Increased slope diversity also benefits usage by animals, such as livestock and wildlife, by providing natural shelter from wind, etc.

Definitions

As used in this document, various terms are defined as follows:

Annual event—an event with a 1-year recurrence interval, i.e., a statistical probability of occurring in 1 of 1 years, or a 100% probability of occurrence at any time. (See also Q1.5 and Q50)

Base level—the channel-bottom elevation associated with the point to which all upstream water drains.

Computer—a workstation, person computer, personal digital assistant (PDA), wireless telephone, or any other suitable computing device. The computer may be coupled to other computers, and/or to the Internet using one or more local area networks (LANs), metropolitan area networks (MANs), wide area networks (WANs), or any other appropriate wireline, wireless, or other links. The various components of the disclosed embodiments hereof may operate on one or more computers at one or more locations, according to particular needs.

Concave longitudinal profile—concave upwards when viewed in cross section. When referring to slopes, the bowl-shaped form toward which stable slopes will tend to evolve when forming in unconsolidated material. When referring to stream channels, the channel-bottom form that is steeper in headwaters and less steep at the channel base level.

Cut to fill balance—the ratio of material that needs to be removed (cut) to the material that needs to be placed (fill) to create the design.

Design boundary—the boundary line that encloses the land surface area that will by designed using embodiments of the present invention. It may coincide with a watershed boundary, or it may be a portion of a watershed.

Drainage density—a ratio of the length of valleys to the land area that encompasses them.

Drainage pattern—the birds-eye view of the channel network in a watershed.

DTM—digital terrain model.

Ephemeral stream—a stream that flows only in direct response to precipitation or snow melt.

Fluvial—related to or produced by flowing rivers or streams

Geomorphic—literally earth-form, landforms.

Gradient—a measurement of slope angle from the horizontal, calculated as change in y (vertical) elevation divided by change in x (horizontal) elevation, and expressed as a dimensionless value. A negative value is sometimes used to indicate that the slope is below horizontal, as when a stream channel flows down hill. Gradient may also be expressed as a ratio of x to y, e.g., 4:1. (also see 'slope')

Headwater elevation—the channel-bottom elevation associated with the most upstream point in the defined channel Module—a unit that includes computer readable code on a computer readable medium.

NOAA—National Oceanics and Aeronautics Administration, the US Federal agency that collects and manages meteorological data.

Q1.5—The stream discharge, Q, associated with an event with a 1.5-year recurrence interval, i.e., a statistical probability of occurring in 1 of 1.5 years, or a 67% probability of occurrence at any time. It is essentially equal to the annual discharge.

Q50—The stream discharge, Q, associated with an event with a 50-year recurrence interval, i.e., a statistical probability of occurring in 1 of 50 years, or a 2% probability of occurrence at any time.

Rational Runoff Method—a standard method for estimating runoff discharge using the formula Q=CIA, where Q=runoff discharge, in units of cubic feet per second, C=runoff coefficient, the proportion of incident precipitation that runs-off the land surface, I=rainfall intensity measured in inches per hour, A=land area in acres for which the Q is calculated.

Sinuosity—the ratio of meandering stream channel length to straight-line valley length, it is a dimensionless value, e.g. 120 feet meandering channel length/100 feet valley length=1.2.

Slope—A landform that rises or falls from the horizontal direction. (also see 'gradient').

Subwatershed—a smaller area within a watershed that captures precipitation and delivers the resulting contained runoff to a downstream point. Embodiments of the present invention break a large watershed into many smaller subwatersheds according to fluvial geomorphic principles and this limits both slope lengths and runoff discharge to values that have stability against erosion that is similar to adjacent undisturbed lands.

TIN file—a triangle mesh file, known points are connected by line segments to form an interconnected mesh of triangles with sides of various lengths that can be used to model the three-dimensional surface on which the known points are located.

Programming Languages

The system and method embodying the present invention can be programmed in any suitable language and technology, such as, Hypertext Markup Language (HTML), Active ServerPages (ASP) and Javascript. Alternative versions maybe developed using other programming languages including, but not limited to: C++; Visual Basic; Java; VBScript; Jscript; BCMAscript; DHTM1; XML and CGI. Any suitable database technology can be employed, but not limited to: Microsoft Access and IBM AS 400.

Figure 2A:
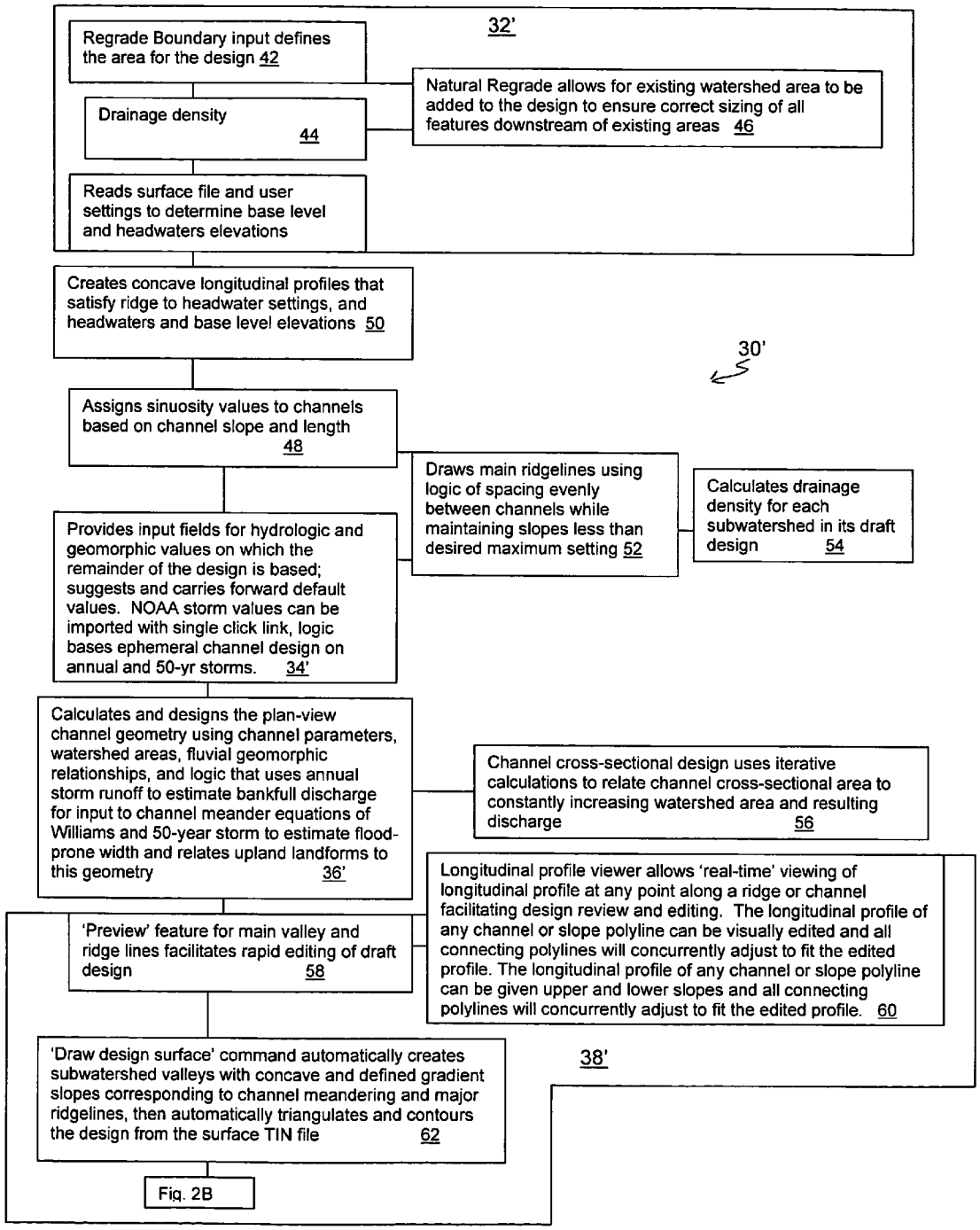
FIGS. 2A and 2B are views similar to that of FIG. 1, of a more detailed embodiment of the present invention.
Figures 2A, 2B:
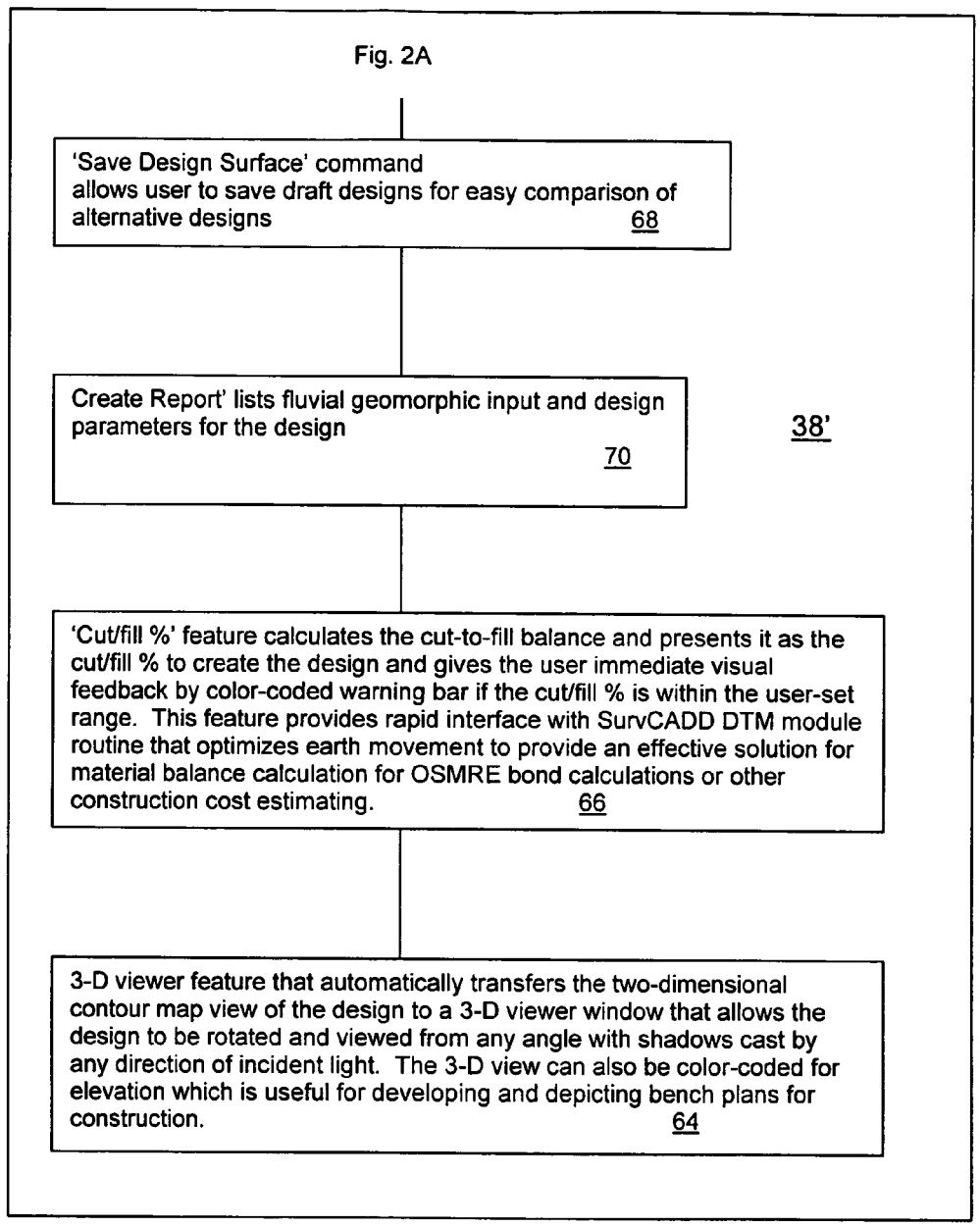

Referring now to FIGS. 2A and 2B, more detailed embodiments, e.g., shown as system 30' and variations thereof, of the present invention will be described. Particular embodiments utilize the Autodesk™ AutoCAD™ graphics design engine (Autodesk, Inc., San Rafael, Calif.) that is used worldwide in the surveying, civil engineering, and mining industries, and thus provides a familiar and user-friendly software environment and graphical user interface (GUI).

As shown, topography input module 32' may include a surface file module 40 to load and access a three-dimensional model of the existing topography of a particular site or locus. A boundary module 42 enables a user to outline an area (e.g., watershed) within the locus to be landscaped (the landscape design area). This outlining may be accomplished using a conventional user interface environment, e.g., by using a computer mouse or pen to 'draw' the desired border on a plan view of the existing topography as shown and discussed below.

A drainage density module 44 may then load the drainage density in the design area. The drainage density may be a value predetermined by the user or obtained by published data for areas of similar surficial materials. Alternatively, module 44 may calculate a drainage density. This calculation may be accomplished by having the user trace existing channels on a site map of another locus having similar surficial materials. Module 44 may then divide the length of the traced channels by the watershed area of this other locus to yield the drainage density. Field verification of this calculated drainage density may be desired.

Optionally, module 32' includes a natural regrade module 46 which enables a user to effectively expand the area of the locus to include various natural features within an overall watershed area, but outside of the area of immediate concern (e.g.,. beyond the area to be re-landscaped). Regrade module 46 thus enables these additional features to be taken into consideration when sizing and shaping the various features of the re-landscaped area discussed below.

Once the drainage density is determined, a sinuosity module 48 may be used to select a sinuosity value appropriate for a design channel. This is accomplished determining channel slope and length from the three-dimensional model of the existing topography of the site, and assigning geomorphologically appropriate sinuosity values based on those parameters. These sinuosity values are based on data obtained from naturally occurring phenomena, and are generally inversely related to slope, tending to be lower (e.g., less than about 1.2, see sinuosity definition) on relatively steep slopes (e.g., those having gradients of greater than about 0.04, see gradient definition), and higher (e.g., greater than about 1.2) on slopes of lower gradient (less than about 0.04). Also, appropriate sinuosity tends to be lower near the headwaters, and tends to increase in the downstream direction.

The system then calculates the (nominally) straight-line length that corresponds to the total sinuous channel length.

The user, using the GUI, then draws a desired channel course, including optional branch channels, e.g., in a conventional dendritic pattern, on the landscape design area map to the specified straight line length. Module 48 then applies the specified sinuosity to the channel(s) on the selected course. This module may then calculate the latitude and longitude (e.g., as x and y values) for the channel at the apex of each bend, e.g., using the known latitude and longitude coordinates associated with the site model loaded by module 40 as discussed above. Module 40 similarly calculates the latitude and longitude of each end (i.e., the headwater and channel mouth) thereof. These values may then be exported to a longitudinal profile module 50.

A ridgeline module 52 may be used to define ridgelines spaced at a predetermined location (e.g., substantially evenly spaced) between channels, while maintaining slopes from these ridgelines towards the channels at less than a predetermined level. Moreover, in the event branch channels have been defined, such as by module 48, then a subwatershed module 54 may be used to recalculate the drainage densities for each subwatershed area in the vicinity of a branch channel in the manner described above with respect to module 44. Module 54 may then ensure that the particular branch channels are sufficiently sized to provide the recalculated drainage densities.

Profile module 50 uses elevational information of the locus, including base level, headwater elevation, and slope, taken from the site model acquired by module 40. Module 50 uses this data to generate an elevational curve (profile) taken along the length of the channel. The user may then vary the slope of the profile, e.g., at the headwater or channel mouth, as desired. Profile module will then save these three-dimensional (e.g., x, y, and z) values as a preliminary three-dimensional desired site model for the locus.

Data input module 34' receives data from topography module 32', a user, and/or third parties (e.g., via the Internet), relating to parameters such the area of the locus, drainage density, Regional area/bankfull discharge curves, and precipitation values for average annual and 50 year storms (such as obtained from NOAA precipitation records), to estimate discharge (e.g., the Q1.5 and Q50 stream discharges). These discharges may be estimated using any conventional approach, such as Rational Runoff Method (cite)), NRCS, and TR-55 graphical or tabular (cite).

Channel Geometry module 36' then divides this discharge value by a maximum desired flow velocity (either preprogrammed based on various parameters known to those skilled in the art, or selected by the user) to generate a channel cross sectional area. Using the width to depth ratio for a desired channel type (e.g., a channel type selected by the user), module 36' estimates the Bankfull width, which, along with conventional equations for channel dimensions (e.g., Williams (1986)) is used to create a stream channel geometry and bankfull flow channel cross-sectional dimensions. In addition, the system may calculate channel pattern dimensions for relatively steeper valley wall channels based on the selected channel sinuosity.

The channel's low flow dimensions, based on the annual (Q1.5) discharge, are calculated to be sufficient to transport a low-discharge sediment load. Module 36' may then use the 50-year storm data to estimate and design the channel dimensions for the 50 year storm event (e.g., for the floodprone discharge). The channel banks are raised and the channel depth increased to accommodate the 50-year recurrence interval (Q50) discharges and create floodprone dimensions sufficient to contain most such discharges within the channel.

Module 36' also typically includes an iteration module 56 that generates the aforementioned channel geometries iteratively at various positions along the lengths thereof in the downstream direction so that the channel dimensional characteristics reflect the incremental increases in flow that result from incremental increase in watershed area in the downstream direction.

Design Surface module 38' includes a preview module 58 which generates a plan view of the site, using the existing topography acquired by Input Module 32, along with the dimensional data associated with one or more channels as discussed above. This view generally includes the main ridgelines between the channels, extending to the user-defined boundary and/or natural watershed boundary. Any subridges (as defined above), e.g., extending from channel meander bends up to the main ridgelines, are also included. This view may be easily modified, e.g., by simply clicking and dragging a displayed feature, and/or by other simple GUI functionality common to the aforementioned AutoCAD™ environment. This functionality advantageously allows the user to easily adjust the draft channel pattern to accommodate existing landscape constraints and/or to create a slightly irregular and more natural appearance. The ridgelines between the designed channels may be similarly edited, with the system automatically making associated adjustments such as the valley-wall slopes as the user moves the ridgelines between the channels, or raising or lowering the ridgeline to an elevation required to maintain user-specified valley wall slopes. In this regard, unless overridden by the user, the system may generate slopes calculated to have acceptable slope erosion estimates, such as provided by conventional sources such as USLE (Universal Soil Loss Equation, US Soil Conservation Service, and the Agricultural Research Service, Agricultural Handbook Number 537 (Wischmeier and Smith, 1965)), RUSLE, (Revised Universal Soil Loss Equation, US Dept. of Agriculture, Agricultural Handbook Number 703 (Renard, et al., 1997)). The system similarly may ensure that the generated channels satisfy channel flow and stability estimates provided by such conventional sources as the SEDCAD civil engineering software program for evaluation and design of sediment control structure (Civil Software Design, Lexington, Ky.), and US Army COE (U.S. Army Corps of Engineers).

In the embodiment shown, module 38' also includes a profile module 60, which generates a longitudinal (e.g., elevational) profile for the site plan, using the channel geometries calculated above. This view may also be modified as described above with respect to module 58.

Module 38' may also include a draw design surface module 62, which adds remaining features, in three dimensions, to the desired site model, such as subwatershed valleys and various land profiles. A 3-D viewer 64 facilitates viewing, editing, and evaluation of the proposed site plan.

A cut/fill module 66 facilitates rapid calculation of the material balance involved with the design. The user can edit the design and get near-instantaneous recalculation of the material balance to aid in rapidly creating a design that is not only stable, functional, and aesthetically pleasing, but which can be practically constructed, e.g., using available on-site material.

For example, system 30' may calculate the total volume of material needed to create the three-dimensional design surface, as well as the cut and fill balance based on the amount of on-site material available. (The on-site material may be material that has been re-located, such as for mining operations.) Once the cut and fill balance for a particular design has been calculated, the user may vary features such as ridgeline heights to adjust the material balance as needed to facilitate construction. If greater adjustment is needed to reach a cut and fill balance, the user may also alter the basic channel pattern and valley widths to achieve the desired balance.

Module 38' also includes a save surface module 68 which enables the generated site plan to be edited and saved, e.g., for comparison with alternative plans. A report module 70 permits the output of various parameters associated with the generated site design.

The foregoing embodiments may be stand-alone systems, or may advantageously be configured as modules of the aforementioned SurvCADD™ grading system to advantageously reduce the time needed to create the aforementioned desired topographies. Moreover, the generated three-dimensional surface map may be exported in a variety of electronic formats to other popular surveying, civil engineering, and mining software, such as Vulcan 5™ (Maptek, Pty Ltd., Glenside, Australia), or printed as two-dimensional hard copy. The designed three-dimensional surface has stability against erosion for slopes and channels, while meeting the user input dimensional criteria. The completed design model ay be taken to the construction site using survey and stakes, or output electronically to GPS and/or laser-guided construction equipment.

The embodiments described herein may be used to design fluvial geomorphic landscapes in substantially any location.

Figure 3:
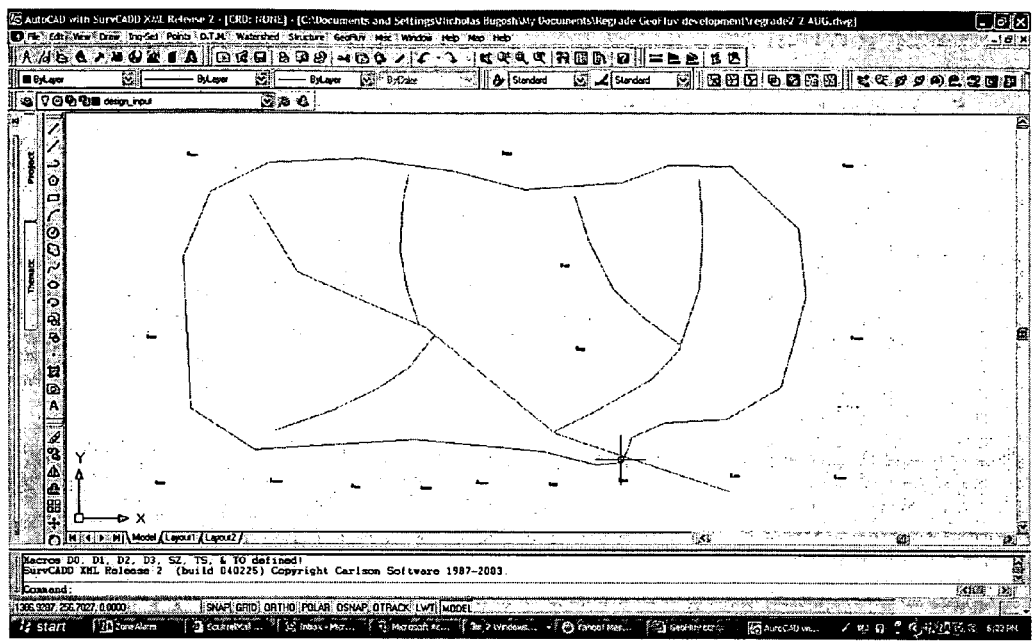
FIGS. 3-31 are screen displays illustrating the operation of an embodiment of the present invention.
Figure 4:
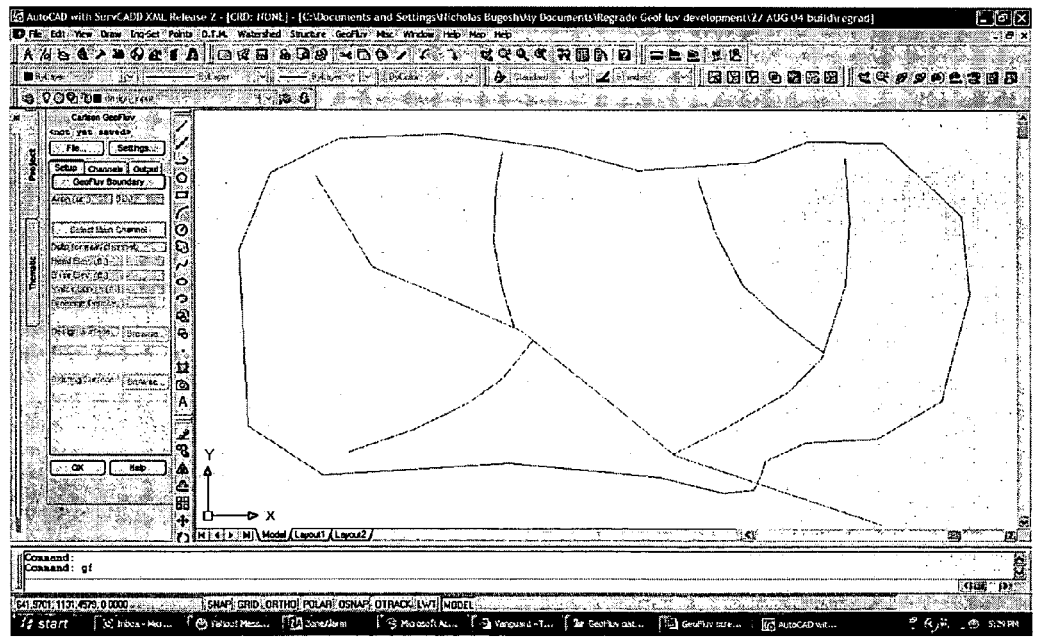

Embodiments of the invention having been described, referring to FIGS. 3-31, the following is a description of the operation thereof. As shown in FIG. 3, the user may sketch the project boundary (which may coincide with watershed boundary or be a subset of the watershed), and a draft drainage pattern. In FIG. 4, a system dialog box is opened, with the boundary button active, and remaining dialog buttons inactive.

Figure 5:
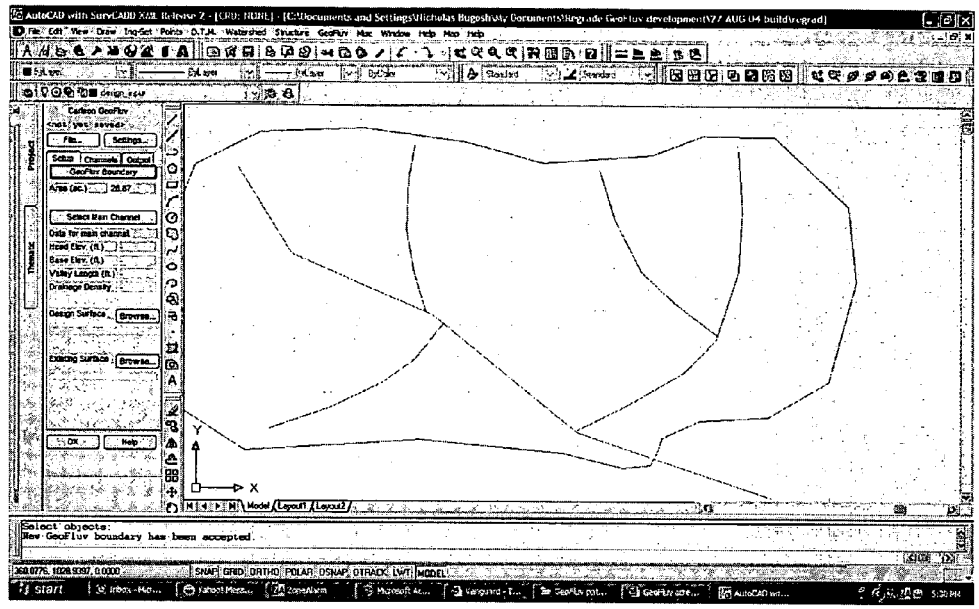
Figure 6:
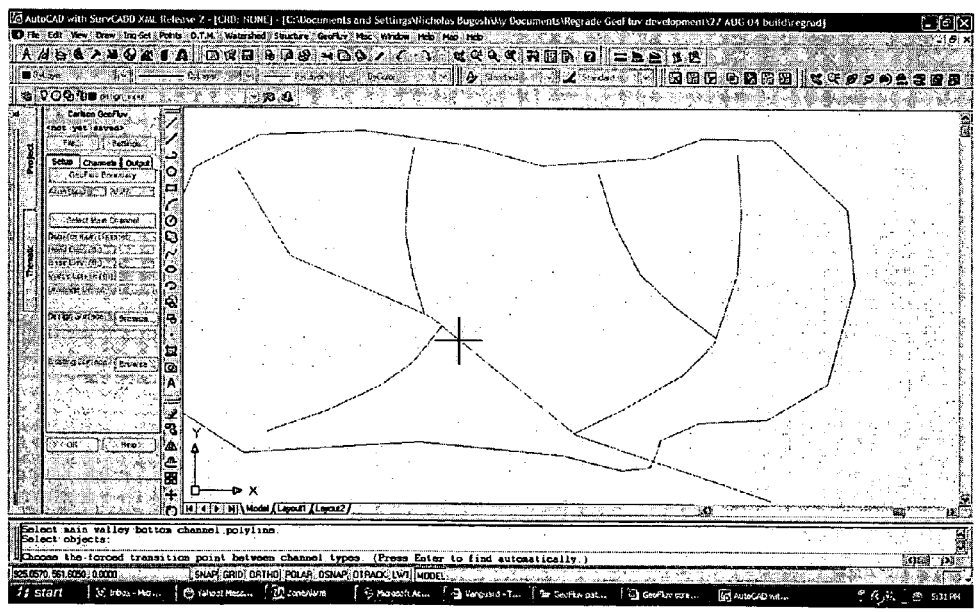

In FIG. 5, the user has selected project boundary. System 30' has calculated and displayed the project area and activated subsequent fields. In FIG. 6, the user has selected the main valley bottom channel and the system offers the option of either permitting the user to choose the transition point from the headwater to bottom reaches, or automatically determining this point.

Figure 7:
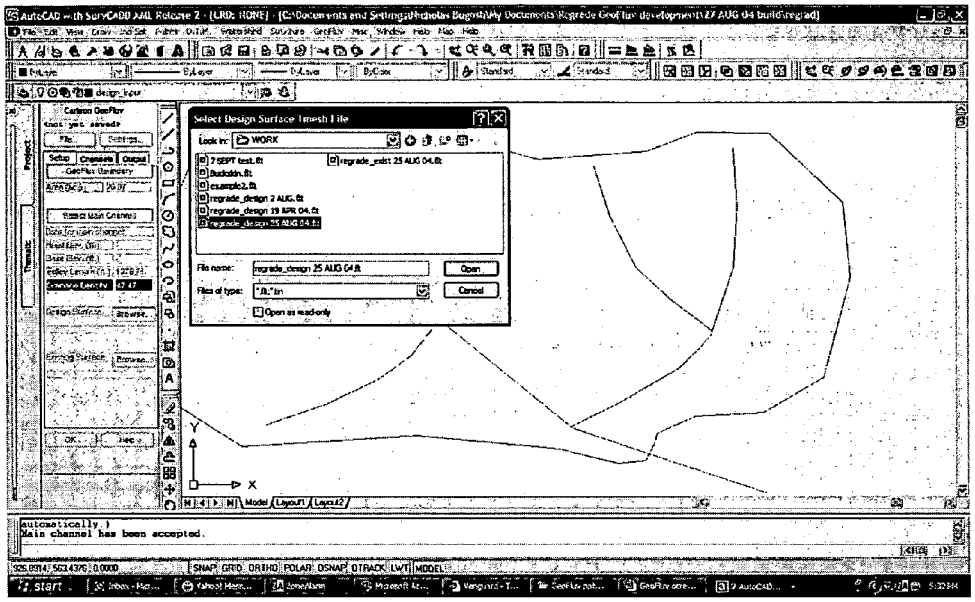
Figure 8:
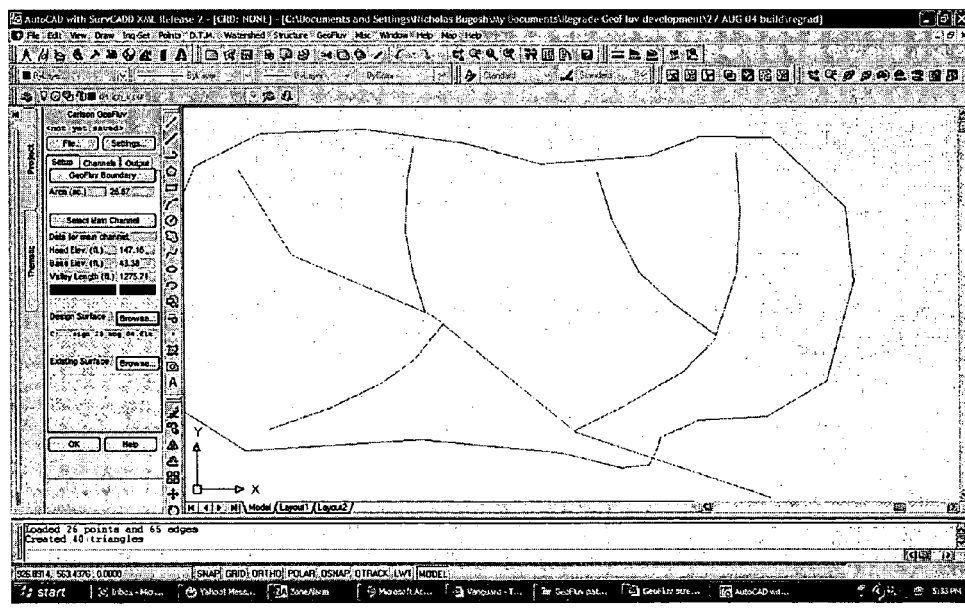

Turning to FIG. 7, the user has selected the main channel, the system displays the main channel's length, and a dialog box to easily enter the three-dimensional existing surface file appears. In FIG. 8, the existing surface file has been selected and appears in the input window. The system has automatically calculated and displayed the main channel's head and base level elevations from the information previously entered and/or from the three-dimensional surface file.

Figure 9:
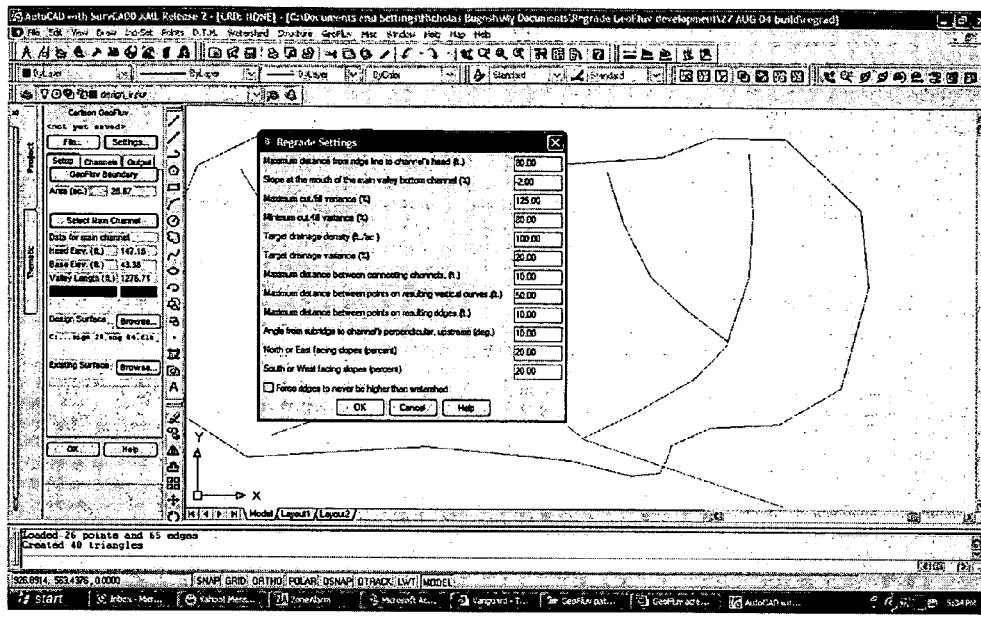

As shown in FIG. 9, the Settings button allows the user to edit information that the system will use in its calculations, which range from default to site-specific values. The system provides default settings that have proven appropriate in the semi-arid western United States. Using the Settings button, the user may also enter a desired cut/fill variance for use by the system's material balance calculator.

Figure 10:
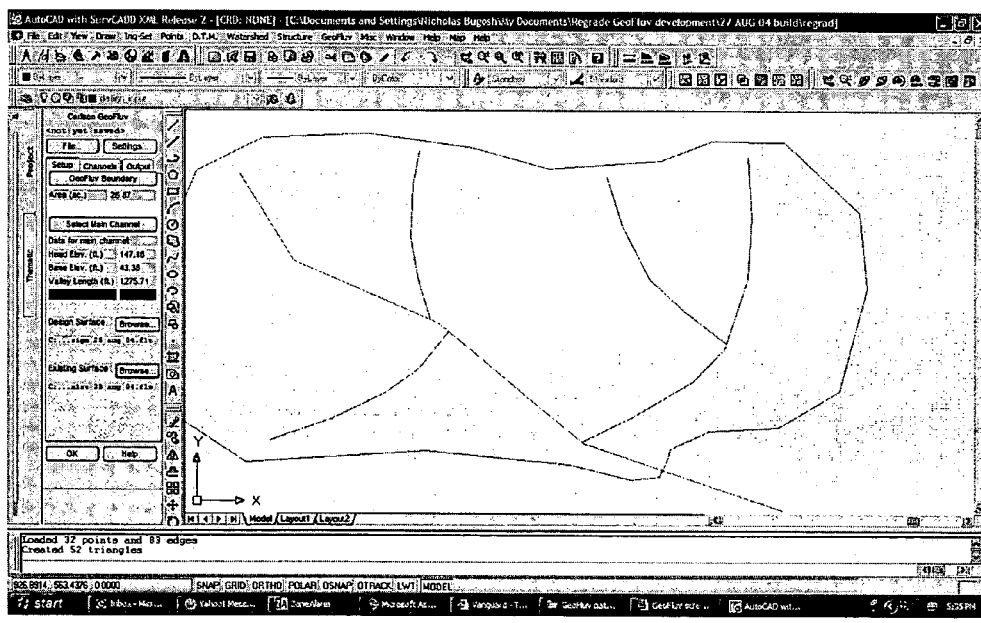

In FIG. 10, the user has input a three-dimensional file for the Existing Surface using the convenient Browse button, which provides a pop-up dialog box as described above. The system can compare surfaces to calculate volumes.

Figure 11:
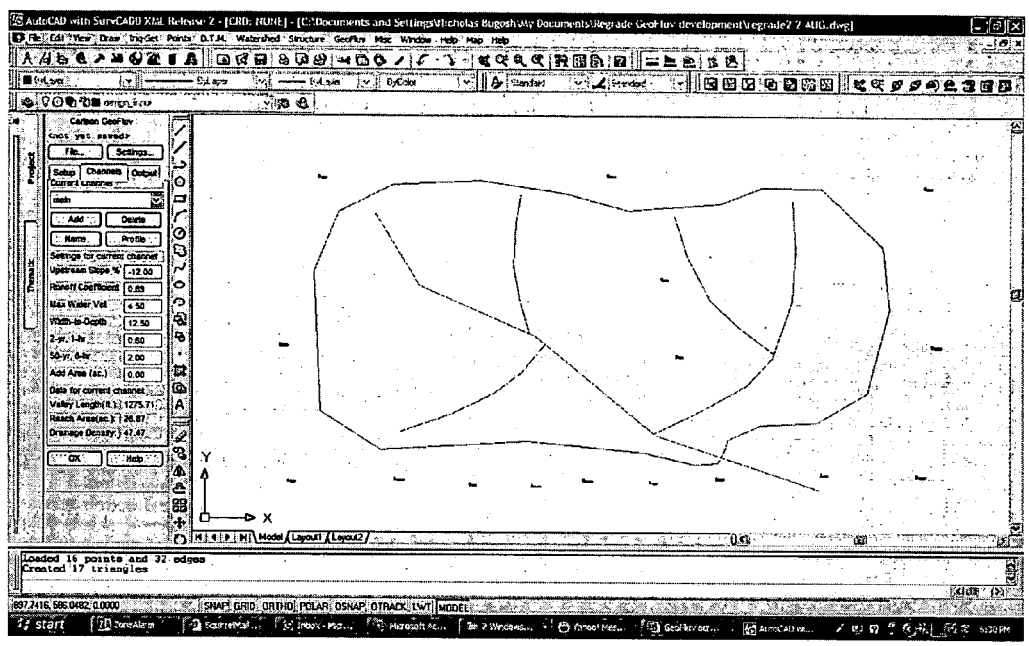
Figure 12:
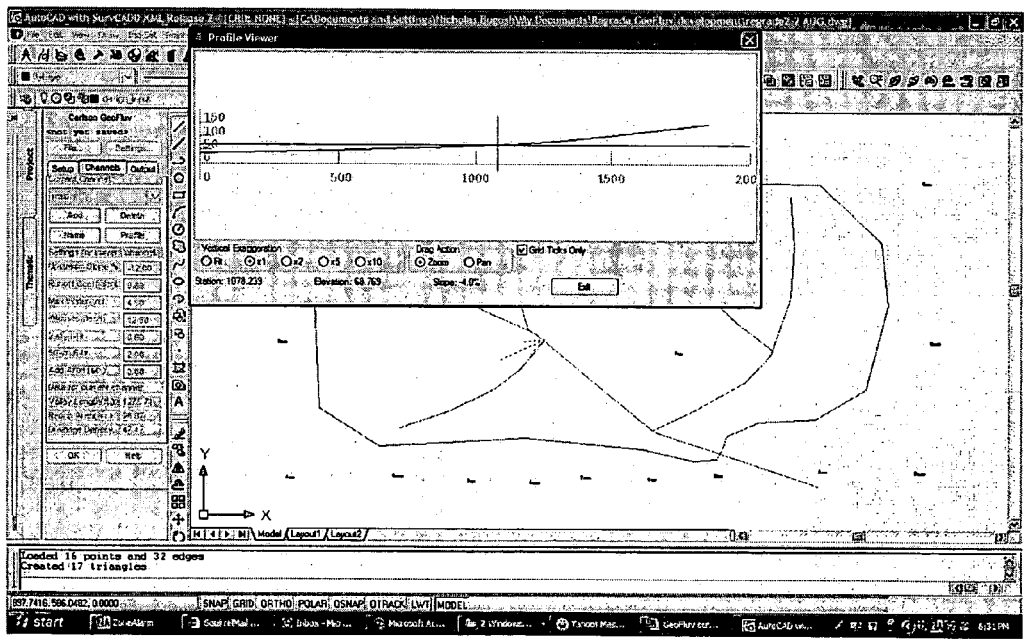

FIG. 11 shows the Channels tab active with default settings. Using the previously input information and the input (default or user specified) values in the channels tab, the system has designed a concave longitudinal profile for the design channels, beginning with the main valley bottom channel. Shown in FIG. 12, the 'Profile' button has generated a pop-up window appearing with the longitudinal profile of the current channel displayed. Moving the cursor across the profile causes the system to display the station, elevation, and slope at any point the cursor crosses. Concurrently, an arrow appears on the drawing indicating the position of the cursor in the longitudinal profile screen. This assists the user in editing the design real time, for example to determine the main channel values at its confluence with a tributary channel.

Figure 13:
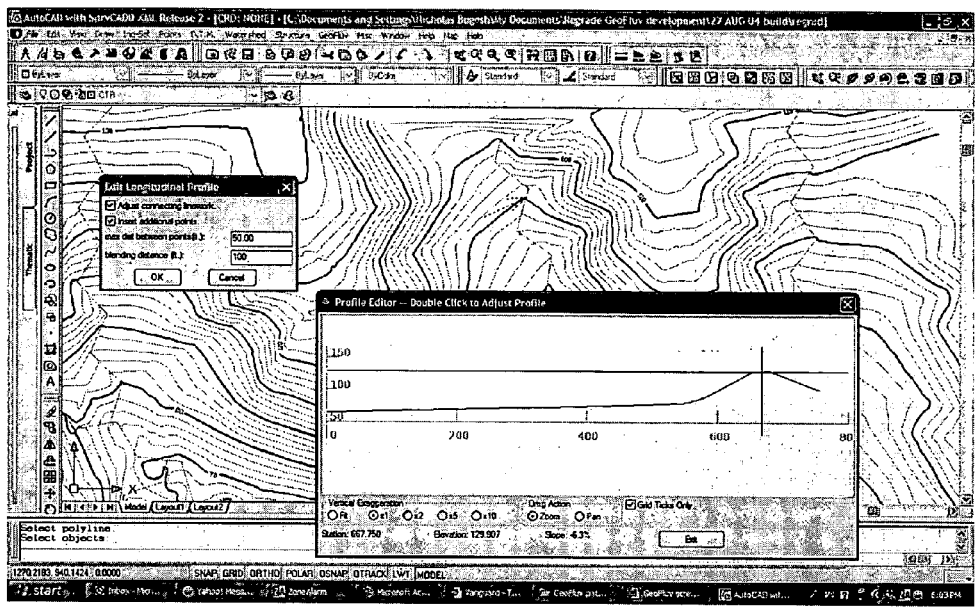

Referring now to FIG. 13, the longitudinal profile tool is also a powerful tool to examine and edit slope profiles. The system enables the user to visually edit the profile of any slope or channel polyline and it will automatically adjust all connecting polylines to fit the edited profile. An arrow appears on the design drawing at the point the cursor is passing in the profile viewer. Double clicking above or below the line 'pulls' the profile to the new elevation. The system also enables the user to edit the upper and lower slope values for any longitudinal profile polyline and all connecting polylines will be adjusted to match the edited profile.

Figure 14:
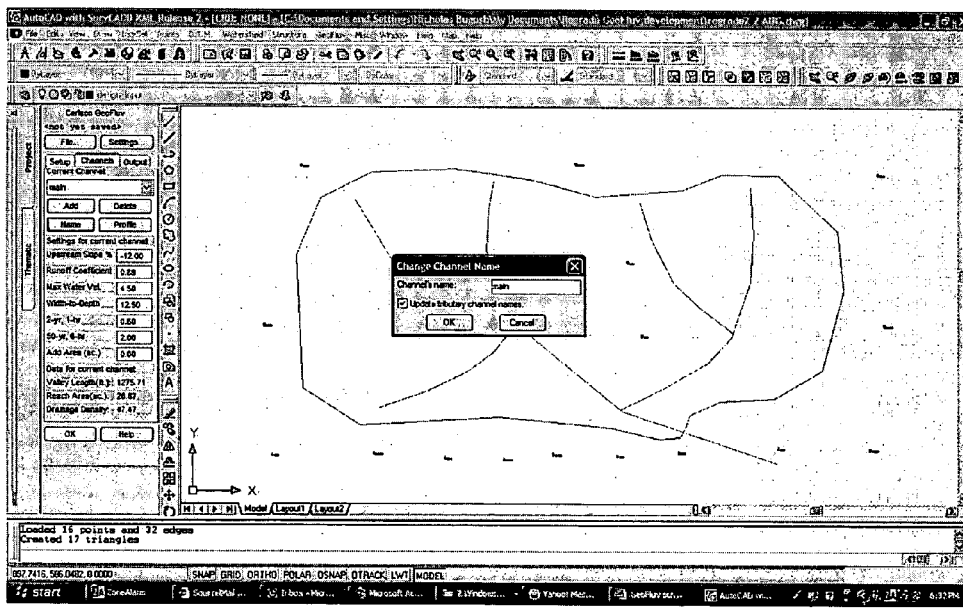
Figure 15:
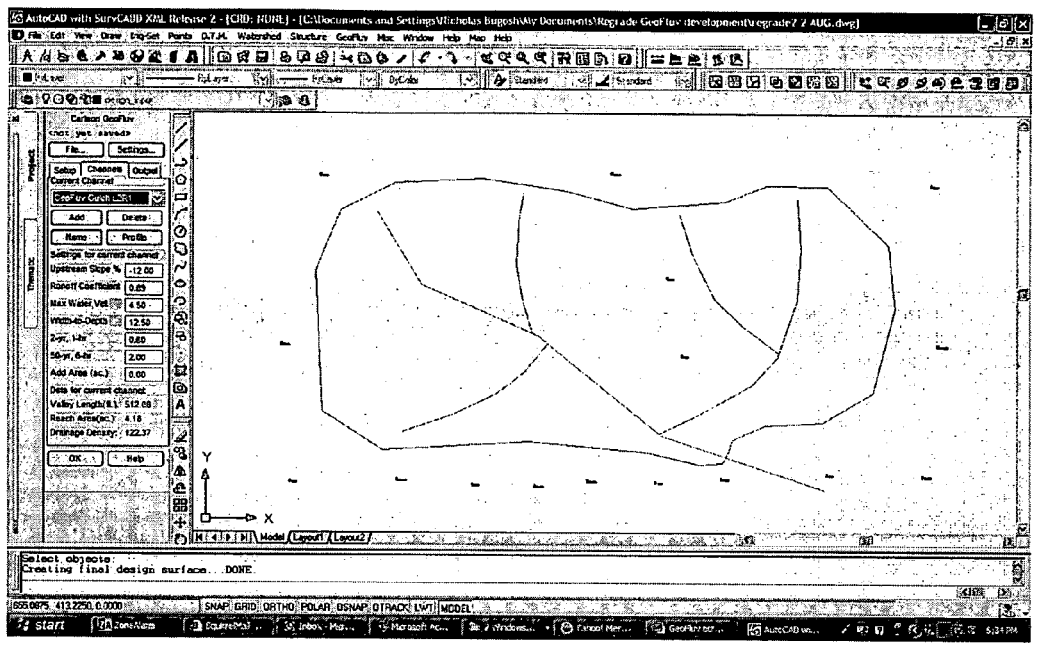

In FIG. 14, the 'Name' button provides for convenient naming of the channels in the generated design. The system automatically assigns names to all channels in the design according to a convention that has proven to eliminate confusion during construction. As shown in FIG. 15, the system numbers channels from the headwaters sequentially downstream, automatically. Regardless of the sequence that the user 'Adds' channels using the 'Add' button, the system continuously adjusts all channel names as they are added to follow this convention until the design is complete. The current channel shown, Gulch L2R1, is the first right-bank tributary entering the second left-bank tributary to Gulch.

Figure 16:
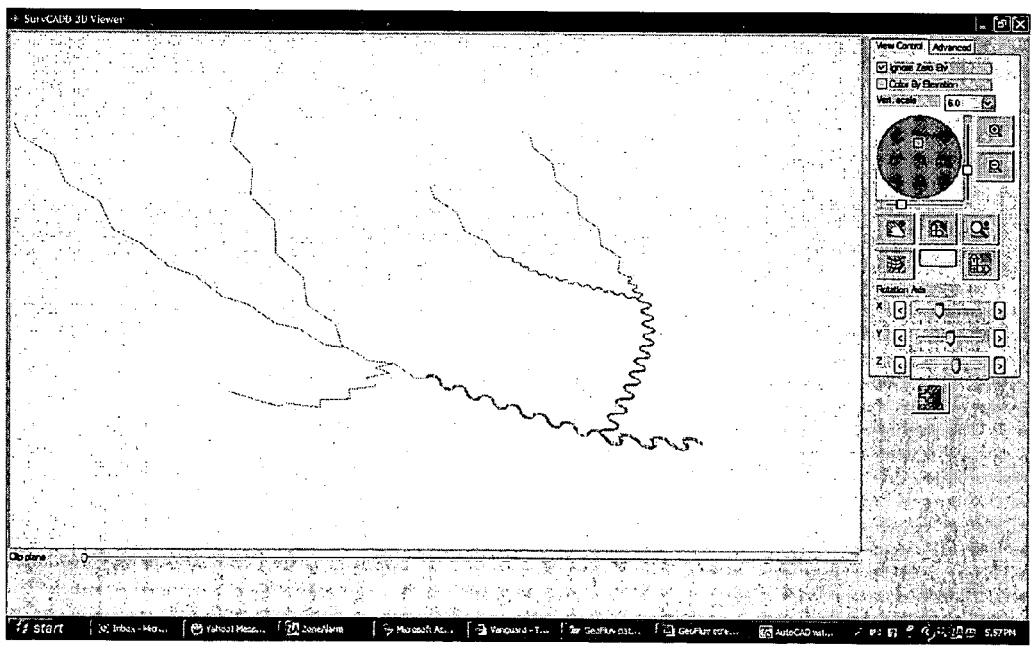

In FIG. 16, the system has constructed a three-dimensional network of channels, with cross sectional dimensions and plan-view geometry based on conveying discharge resulting from annual storms through extreme events (50-year) before greater discharges access the floodplain. All the channels are connected in a continuous concave longitudinal profile as shown in this 3D view (the user does not normally see this view, as all these calculations are performed nearly instantaneously). The view has 6:1 vertical exaggeration to help the user view the design.

Figure 17:
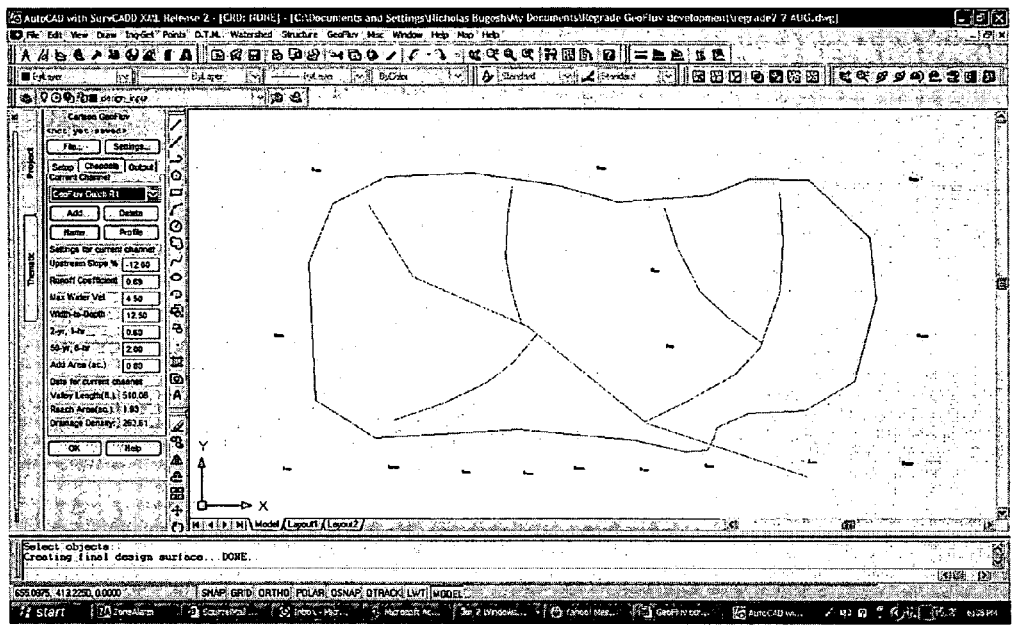
Figure 18:
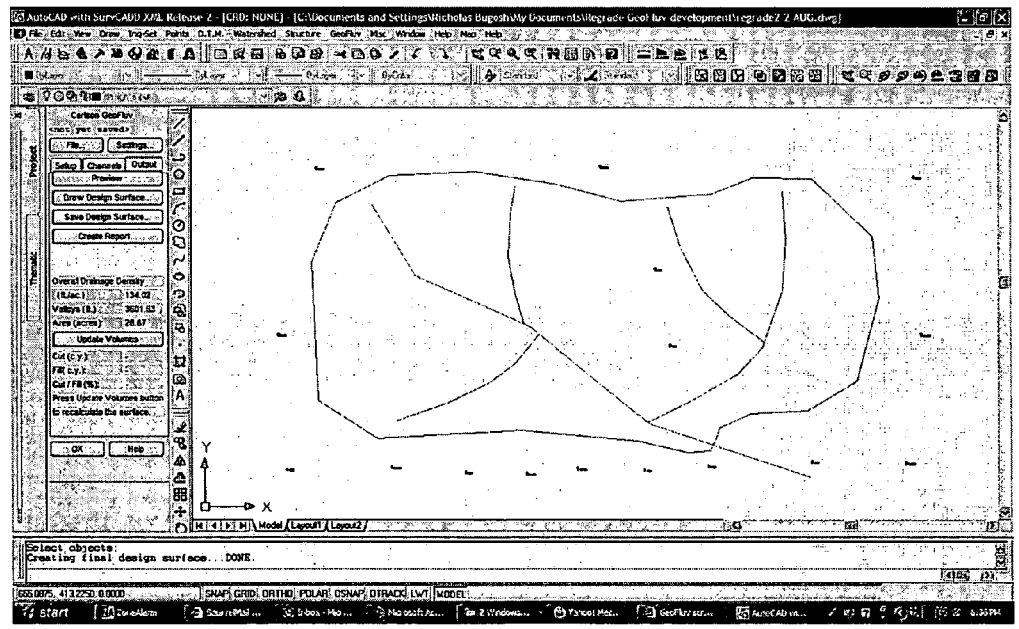
Figure 19:
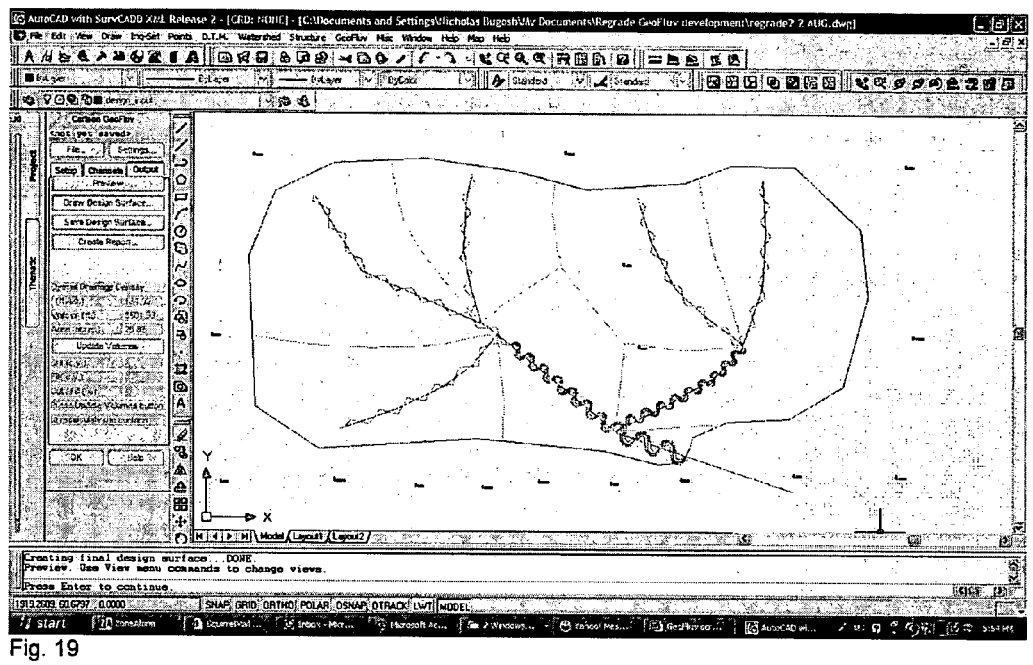
Figure 20:
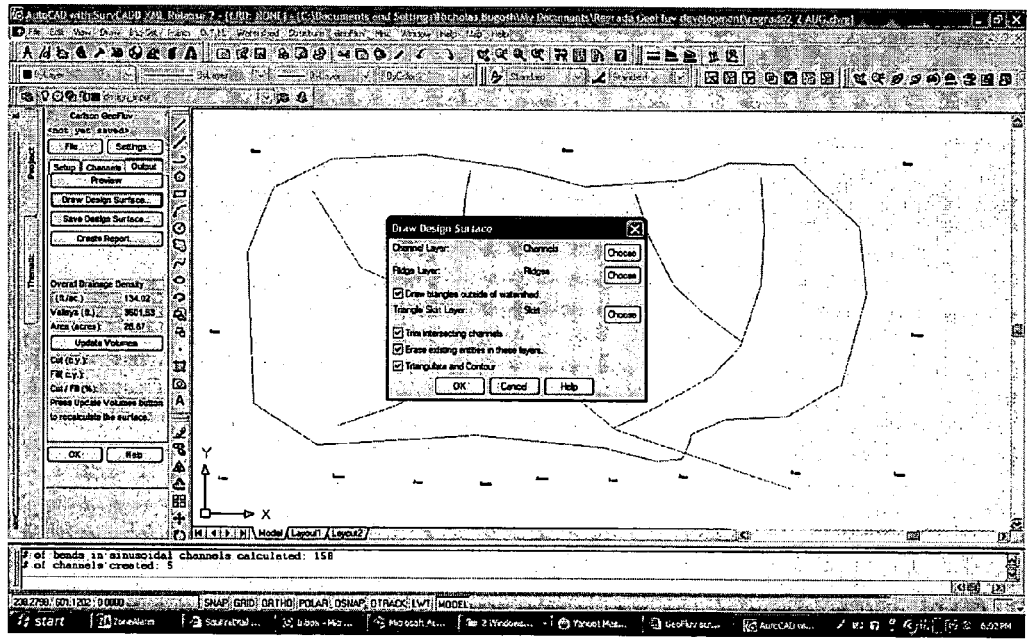

As shown in FIG. 17, as each channel is added, the system defines the ridgelines between the new channel and the nearest adjacent channels or design boundaries. The system calculates and displays below the channel input windows the area of the new channel's subwatershed, the length of the new channel, and the drainage density of the new channel's subwatershed. The user can shift ridgelines to vary the drainage densities towards the design target. In the output tab of FIG. 18, the overall drainage density for the design is calculated and reported to allow the user to determine if the design meets the target drainage density.

The 'Preview' button (FIG. 19) displays the channel reaches and main ridgelines that the system has designed using the user inputs. Channels steeper than −0.04 gradient are depicted as zig-zag lines and channels less than −0.04 gradient are shown as sinuously curved lines. The dimension lines for cross sections of the less than −0.04 gradient channels are shown. This preview allows the user to conveniently realign the channels and ridges, for example, to avoid a particular feature like a property boundary or cultural resource, or to vary the channel pattern from the idealized design to create a more random and natural appearance.

The 'Draw Design Surface' button (FIG. 20) provides a pop-up window that the user can use to specify various settings, such as extending triangulation outside the design boundary for more accurate interpolation, for the 'Draw Design Surface' command. The user can edit the default settings or accept them, and select the 'OK' button to proceed with the specified settings.

Figure 21:
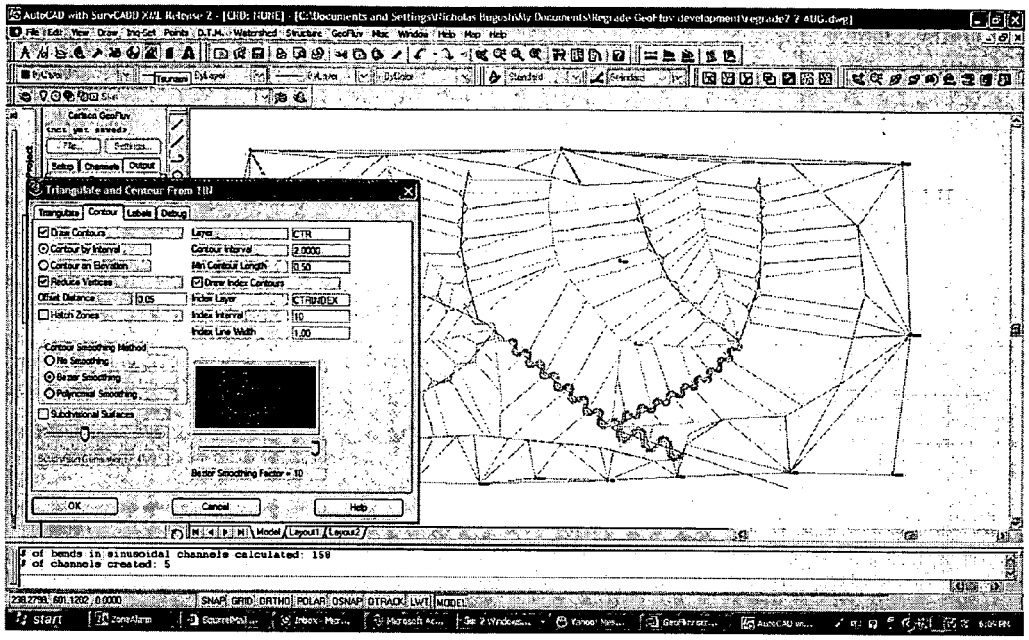

As shown in FIG. 21, the system uses all the input data, including main ridgeline plan view curvature and channel meanders, to add subridges and subridge valleys to the design. The system automatically creates concave longitudinal profiles for all of these surfaces. It presents a pop-up dialog box with which the user can edit contouring or select default values for one-button contouring from the TIN file.

Figure 22:
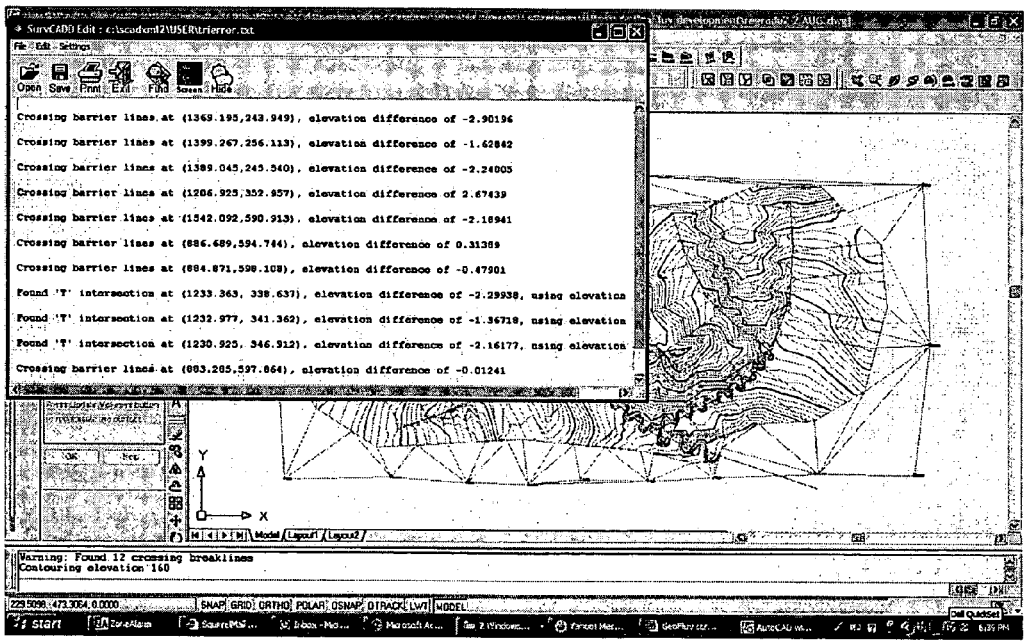

The system contours the design and displays a pop-up dialog box with potential contouring conflicts for easy user inspection of the drawing, as shown in FIG. 22.

Figure 23:
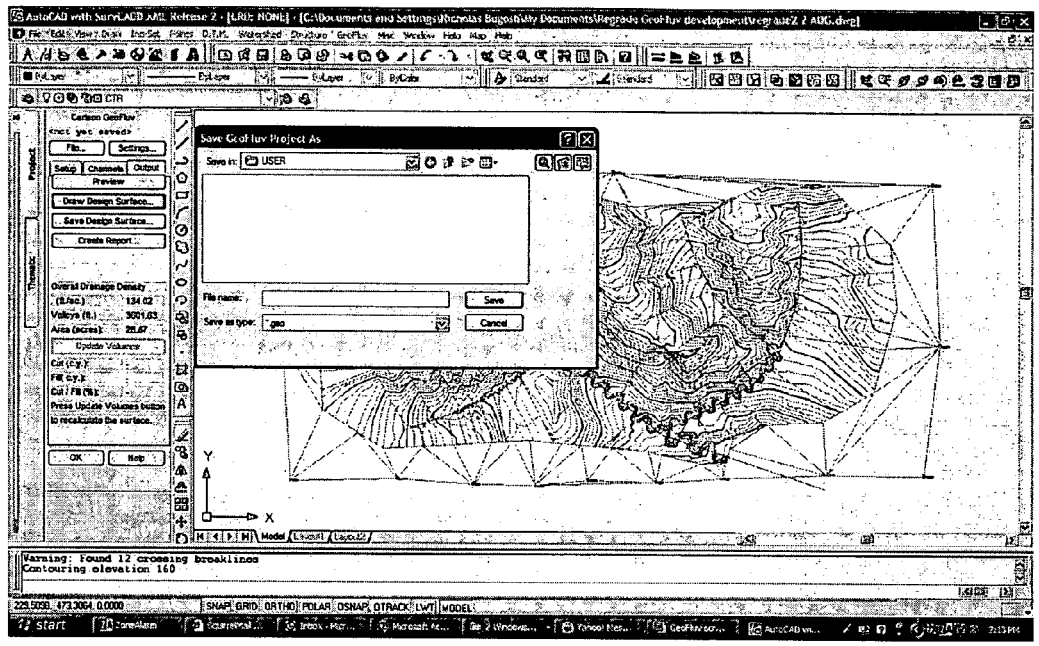

Once the user has cleared the contouring error dialog box, as shown in FIG. 23, the system-presents a pop-up dialog box that offers the user an opportunity to save the draft design. The system offers the user the opportunity to create, in minutes, different designs for evaluation of alternatives, thereby avoiding an otherwise lengthy and cost-prohibitive process.

Figure 24:
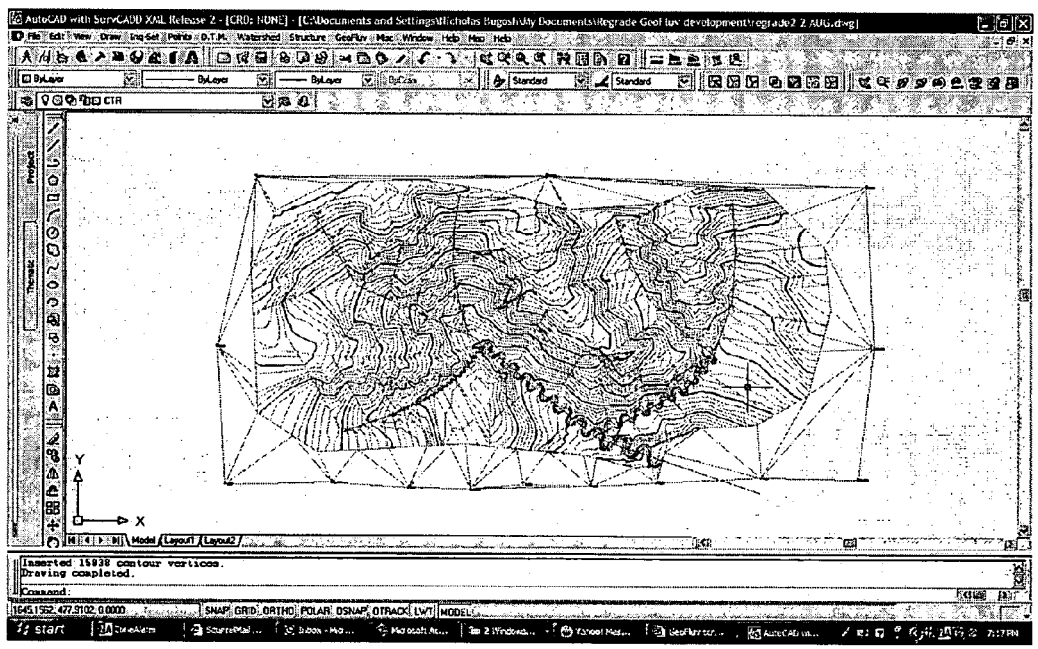
Figure 25:
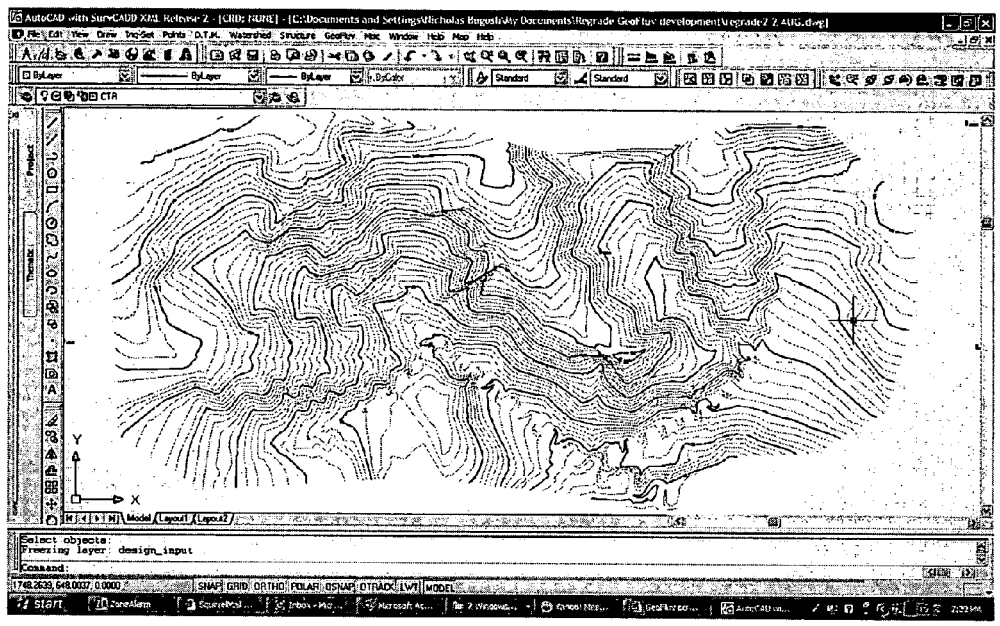
Figure 26:
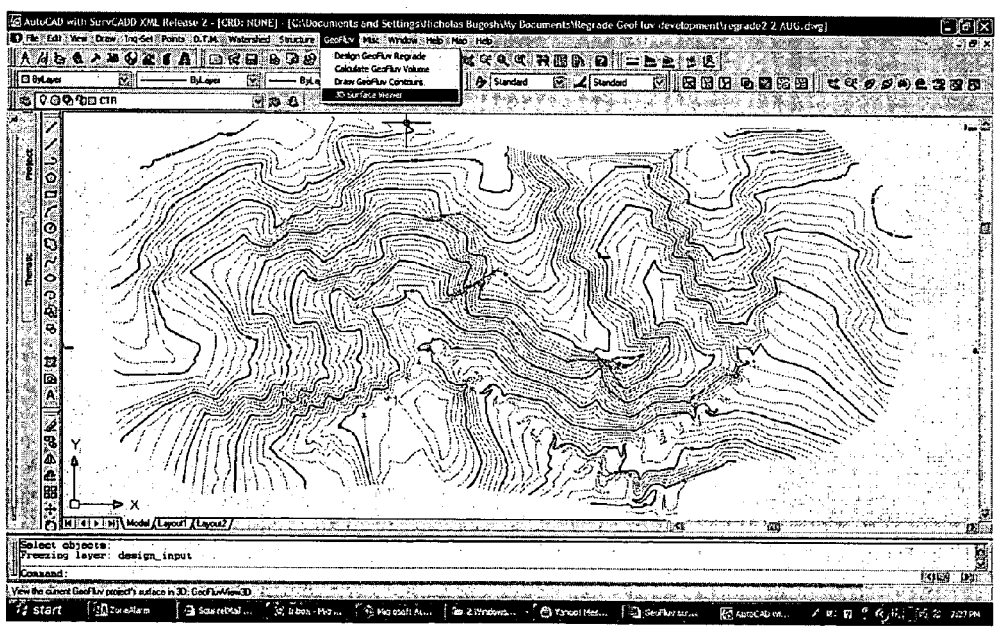

Turning to FIG. 24, once the user clears the 'Save Project As' dialog box, the dockable dialog box clears from the screen allowing full access to all SurvCADD™ (and AutoCAD™) commands. The user may, for example, remove design elements such as ridgelines from the drawing view using powerful SurvCADD editing commands, e.g., freeze layer. The user may then view the design as a topographic contour map (FIG. 25).

Figure 27:
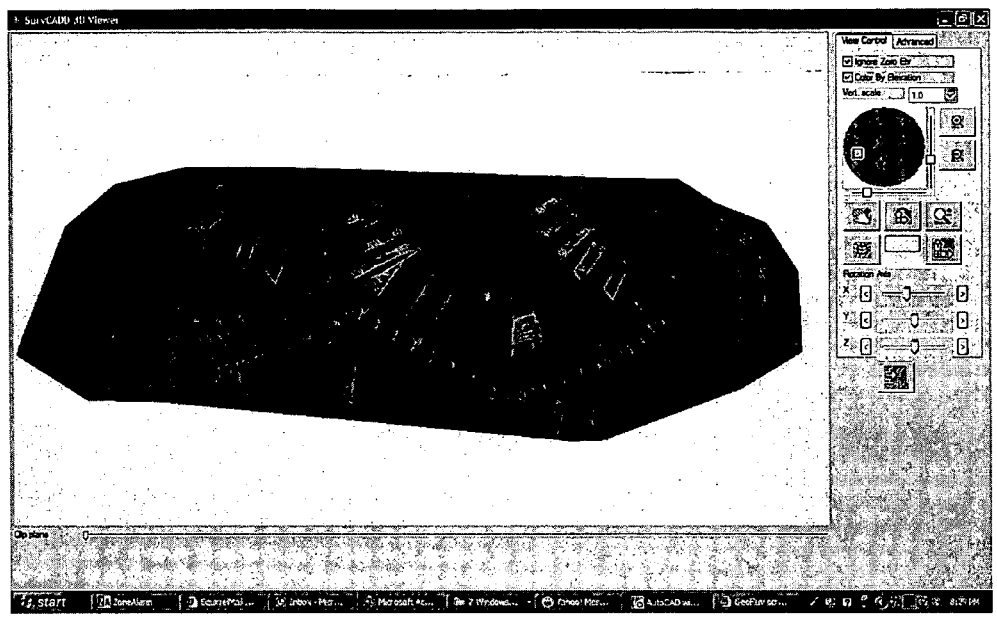

The system menu (FIG. 26) includes a selection to view the TIN surface module of the design as three-dimensional image with one-button click access to the 3D viewer. The '3D viewer' rendering of the TIN surface model of the design surface is shown in FIG. 27. The '3D viewer' also allows the TIN model of the design surface to be colored according to elevation. This feature assists in creating bench plans for efficient construction of the design, especially when coordinated with GPS equipment guidance and machine control technologies. The system allows on-the-fly design changes that can be sent directly to machine operators using radio, IP connections, etc.

Figure 28:
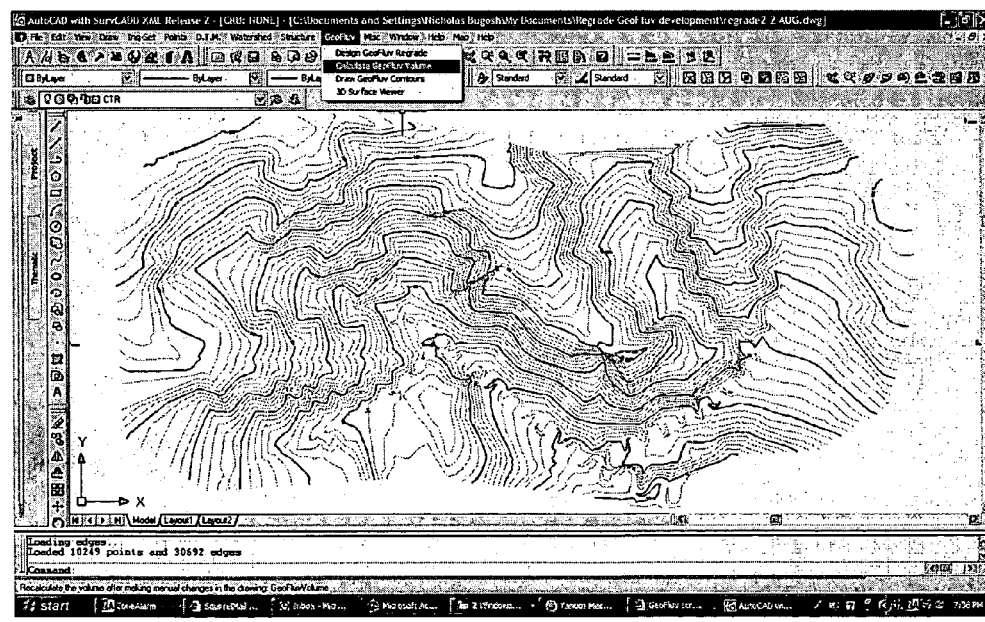
Figure 29:
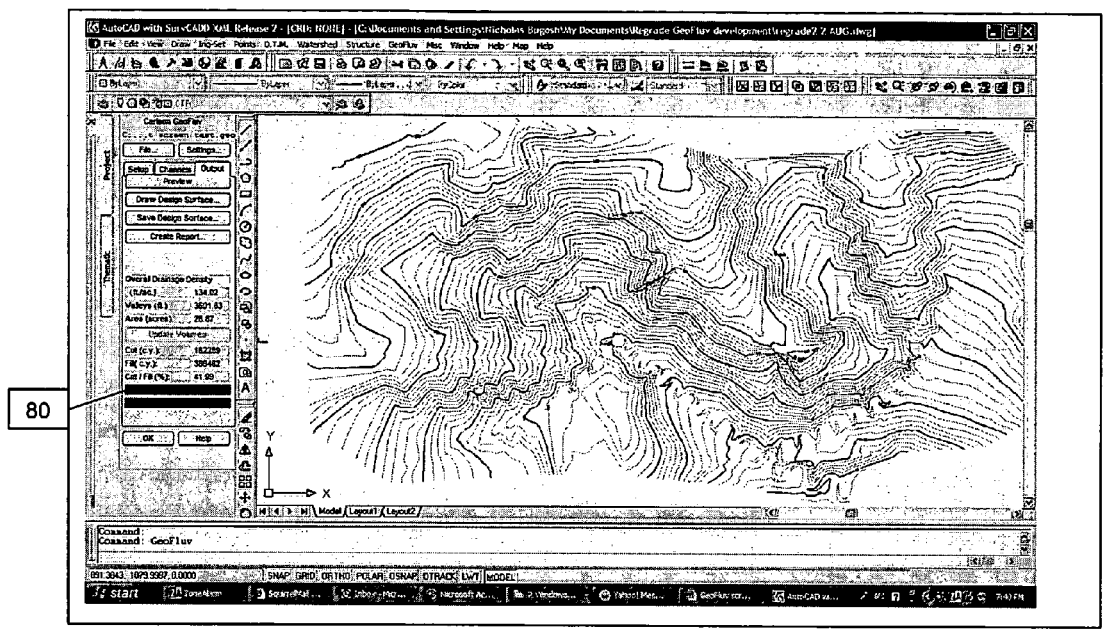
Figure 30:
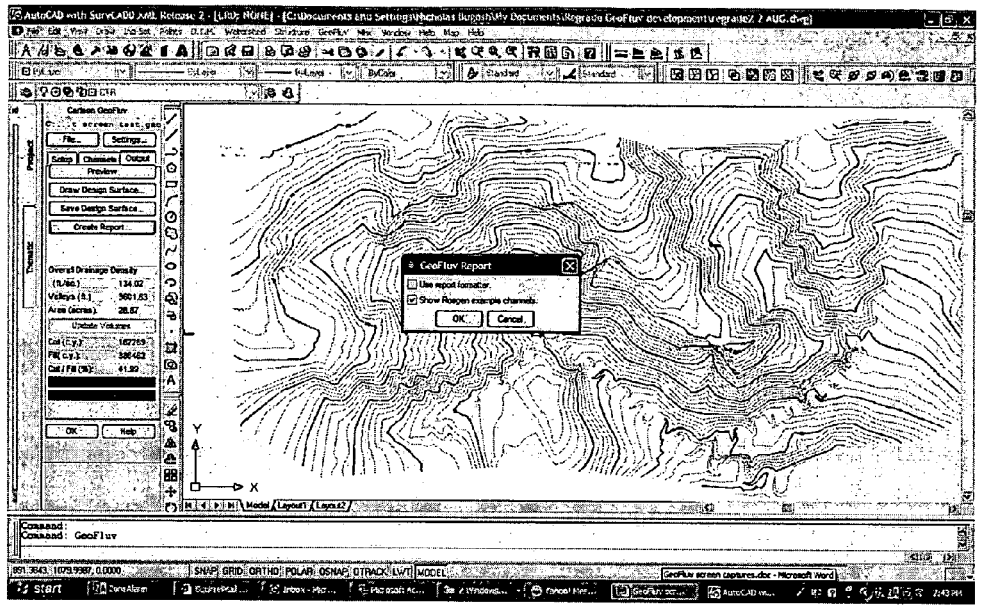
Figure 31:
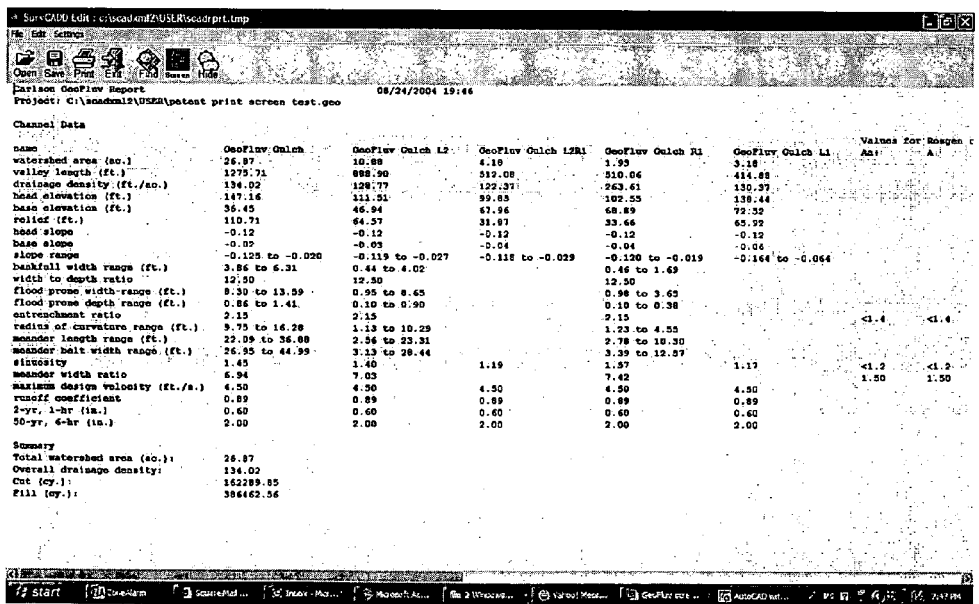

As shown in FIG. 28, the system menu also includes the ability to calculate the cut/fill balance as the design is edited. In FIG. 29, the dockable dialog box displays the cut to fill variance from balance as a percent. Additionally, if the cut/fill balance is within the user-specified tolerance in the system 'Settings', the balance appears highlighted in green; if the balance is outside the user-specified tolerance, it is highlighted in red, as shown at 80.

The 'Create Report' button (FIG. 30) displays a pop-up dialog box that allows the user to customize the report format or accept default values, and display or not display channel characteristic values for a standard channel classification scheme for comparison with report values for the design. The Report (FIG. 31) displays various values that are used to create each design channel. Values for typical channel types may also be displayed for comparison. This report feature makes it easy for the user to identify areas that he may want to edit and to evaluate the effect of design editing.

The following illustrative example is intended to demonstrate certain aspects of the present invention. It is to be understood that this example should not be construed as limiting.

EXAMPLE

An exemplary software system was produced in accordance with the foregoing teachings, and included the functions listed below:

Localized settings for ridge line to channel head
Localized settings for target drainage density
Automatic calculation and display of drainage density for each subwatershed
Setting for percent variance from target drainage density and color-coded notification of maintenance or exceedance of user-specified variance
Setting for percent variance from cut/fill balance for the design and one-button calculation of material balance with color-coded notification of maintenance or exceedance of user-specified variance
Setting for detail resolution on vertical curves
Setting for detail resolution on ridge lines
Setting for global drawing of subridge angles from channels to main ridgelines
Setting for slope angle based on slope aspect
Setting to limit the design ridge height to less than watershed boundary elevation or allow higher local elevations
One-button calculation of area of the design
Ability to add and incorporate upstream runoff into the design
One button design of main valley bottom channel to default settings
Ability to segregate any channel into steeper gradient headwater and lower gradient valley-bottom reaches with a single click
One-button selection of three-dimensional design and existing surface files for the design work and cut/fill material volume calculations
Automated channel-naming routine to name each channel according to a convention to facilitate easy communication during construction
One-button longitudinal profile viewer and powerful profile editor with real-time position locator on drawing provides for easy design editing
Changing any channel setting automatically redesigns entire project in accordance with new parameter
One-button access to NOAA precipitation database and click importation of precipitation data to channel design
Automatic connection of each tributary channel to its receiving channel at matching gradient and calculation and design of tributary channel from confluence to headwater with correct sinuosity and channel geometry for channel gradient
Automatic creation of continuously enlarging channel cross sections according to specified width to depth ratio and discharge calculated as a function of the continuously increasing watershed area
Automatic design of main ridges between channels as the channels are added to the design
Automatic design of subridges and subridge valley slopes from main ridges to channels as the channels are added to the design
Ability to draw entire design with one-button selection. Provision for preferences on design attributes to be considered and displayed in drawing
Single click creates TIN file and contours entire design and draws contours
Automatic reporting of any contouring irregularities facilitates fast inspection and detail editing
Ability to save design projects with a single click facilitates rapid creation and comparison of alternative designs
One-button Update Volume calculation provides near-instantaneous volume calculations for completed design provides ability to immediately see the effect of design edits on material balance
3-D surface view allows one-button viewing of three-dimensional TIN file model of design
3-D contour view allows one-button viewing of three-dimensional design as surface would actually appear
Powerful cut/fill centroids routine locates the center of a material mass needed to create the design, the center of a volume where the material mass needs to be moved to create the design, and the optimal material movement route for placement of the material.

One-button creation of a design report that displays all fluvial geomorphological parameters used to create the design for each channel and provides for comparison to established channel type parameters Although the embodiments discussed herein have been described in conjunction with the creation of proposed landforms having ephemeral channels, those skilled in the art should recognize that the teachings hereof may be used to create landforms having intermittent and/or perennial channels, without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A system for producing erosionally stable fluvial geomorphic landscape designs in a computer aided design environment, said system comprising:
   a computer usable medium having a computer readable program code embodied therein, wherein said computer readable program code is executable by a computer, and said computer includes:
      a topography input module configured to access a three-dimensional model of existing topography of a site;
      a data input module configured to receive data associated with the site, including drainage density and precipitation data in the range of at least an annual precipitation event to a 50-year recurrence precipitation event, to calculate a discharge value for the discharge of storm water from the site;
      a channel geometry module configured to divide the discharge value by a maximum desired discharge flow velocity to generate cross-sectional dimensions for a plurality of proposed ephemeral channels and ridges disposed therebetween;
      the cross-sectional dimensions being sufficient to convey discharge in the range of at least an annual precipitation event to a 50-year recurrence precipitation event;
      the cross-sectional dimensions being re-calculated iteratively at locations along the lengths of the channels to adjust the channel dimensions to reflect incremental increases in watershed area and flow in the downstream direction; and
      a design surface module configured to generate plan and elevational views of a proposed landform at the site using the existing topography, the channels, and the ridges;
   wherein a three-dimensional model of the proposed landform is created according to fluvial geomorphic principles and site-specific data.

2. A system for producing erosionally stable fluvial geomorphic landscape designs in a computer aided design environment, said system comprising:
   a computer usable medium having a computer readable program code embodied therein, wherein said computer readable program code is executable by a computer, and said computer includes:
      a topography input module configured to access a three-dimensional model of existing topography of a site;
      a data input module configured to receive climatic and hydrological data associated with the site;
      a channel geometry module configured to utilize the three-dimensional model and the data to generate dimensions for one or more proposed ephemeral channels;
      a design surface module configured to generate a graphical view of a proposed landform at the site using the existing topography, and the one or more proposed ephemeral channels.

3. The system of claim 2, wherein the data input module is configured to receive drainage density and precipitation data for the site, including data for an annual precipitation event.

4. The system of claim 3, wherein the data input module is configured to receive user defined elevational data for the site.

5. The system of claim 3, wherein the data input module is configured to obtain the data via a computer network.

6. The system of claim 2, wherein the data input module is configured to receive drainage density and precipitation data for the site, including data for a 50-year recurrence precipitation event.

7. The system of claim 2, wherein the channel geometry module is configured to divide the discharge value by a desired discharge flow velocity to generate cross-sectional dimensions for the one or more proposed ephemeral channels.

8. The system of claim 2, wherein the channel geometry module is configured to generate dimensions for one or more intermittent channel or perennial stream channel.

9. The system of claim 7, wherein the cross-sectional dimensions are sufficient to convey discharges associated with a 50-year recurrence precipitation event.

10. The system of claim 7, wherein the channel geometry module is configured to calculate cross-sectional dimensions iteratively at locations along the length of the channels to account for incremental increases in watershed area and flow in the downstream direction.

11. The system of claim 2, wherein the channel geometry module is configured to generate at least one complementary landscape feature selected from the group consisting of complex slopes, ridges, and valleys.

12. The system of claim 11, wherein the design surface module is configured to generate a graphical view of a proposed landform at the site including a pattern of channels and the at least one complementary landscape feature.

13. The system of claim 11, wherein the design surface module is configured to generate a three-dimensional model of the proposed landform according to fluvial geomorphic principles and site-specific data.

14. The system of claim 2, further comprising a cut/fill module configured to calculate material balance of the proposed landform relative to the existing topography.

15. The system of claim 14, wherein the design surface module is configured to selectively display a view of the existing topography and the proposed landform.

16. The system of claim 14, wherein the cut/fill module is configured to generate cut and fill values for points within the site.

17. The system of claim 16, comprising a geography altering machine having a GPS receiver system including one or more GPS signal-receiving antennae disposed thereon, wherein the cut and fill values provide a real time indication of the cut/fill required at the location of the machine to bring the elevation at the location to that specified by the proposed landform.

18. The system of claim 17, wherein the geography altering machine comprises a machine selected from the group consisting of motor graders, bulldozers, trucks, power shovels, and excavators.

19. The system of claim 14, wherein the proposed landform is configured to be built using available on-site material.

20. The system of claim 2, wherein the design surface module is configured to enable adjustment of at least one parameter of the proposed landform, and using the channel geometry module, re-generate the graphical view based on the adjusted parameter.

21. A computer implemented method for generating erosionally stable fluvial geomorphic landscape designs in a computer aided design environment, said method comprising:
  (a) accessing a three dimensional model of an existing topography of a site;
  (b) receiving climatic and hydrological data for the site;
  (c) generating dimensions for one or more ephemeral channels using the three-dimensional model and the data; and
  (d) generating a graphical view of a proposed landform at the site using the existing topography, and the one or more proposed ephemeral channels;
  wherein said (a) through (d) are performed by the computer.

22. The method of claim 21, wherein said receiving (b) comprises receiving drainage density and precipitation data for the site, including data for an annual precipitation event.

23. The method of claim 22, wherein said receiving (b) comprises receiving user defined elevational data for the site.

24. The method of claim 22, wherein said receiving (b) further comprises receiving the data via a computer network.

25. The system of claim 2, wherein the data input module is configured to receive drainage density and precipitation data for the site, including data for a 50-year recurrence precipitation event.

26. The method of claim 21, wherein said generating (c) comprises dividing the discharge value by a desired discharge flow velocity to generate cross-sectional dimensions for the one or more proposed ephemeral channels.

27. The method of claim 21, wherein said generating (c) further comprises generating dimensions for one or more intermittent channel or perennial stream channel.

28. The method of claim 26, wherein the cross-sectional dimensions are sufficient to convey discharges associated with a 50-year recurrence precipitation event.

29. The method of claim 26, wherein said generating (c) is effected iteratively to calculate cross-sectional dimensions at locations along the length of the channels to account for incremental increases in watershed area and flow in the downstream direction.

30. The method of claim 21, wherein said generating (c) further comprises generating at least one complementary landscape feature selected from the group consisting of complex slopes, ridges, and valleys.

31. The method of claim 30, wherein said generating (d) comprises generating a graphical view of a proposed landform at the site including a pattern of channels and the at least one complementary landscape feature.

32. The method of claim 30, wherein said generating (d) comprises generating a three-dimensional model of the proposed landform according to fluvial geomorphic principles and site-specific data.

33. The method of claim 21, comprising (e) calculating the difference in material volume between the existing topography and the proposed landform to provide a material balance.

34. The method of claim 33, comprising (f) selectively displaying a view of the existing topography and the proposed landform.

35. The method of claim 33, wherein said calculating (e) comprises generating cut and fill values for points within the site.

36. The method of claim 35, wherein said generating (d) and said calculating (e) is effected in conjunction with operation of a geography altering machine having a GPS receiver system including one or more GPS signal-receiving antennae disposed thereon, wherein the cut and fill values provide a real time indication of the cut/fill required at the location of the machine to bring the elevation at the location to that specified by the proposed landform.

37. The method of claim 36, wherein the geography altering machine comprises a machine selected from the group consisting of motor graders, bulldozers, trucks, power shovels, and excavators.

38. The method of claim 33, wherein the proposed landform is configured to be built using available on-site material.

39. The method of claim 21, further comprising:
  (e) enabling a user to adjust at least one parameter of the proposed landform; and
  (f) repeating said generating (c) and (d) based on the user adjusted parameter.

40. An article of manufacture for generating erosionally stable fluvial geomorphic landscape designs in a computer aided design environment, said article of manufacturing comprising:
  a computer usable medium having a computer readable program code embodied therein wherein said computer readable program code is executable by a computer, said computer usable medium including:
  computer readable program code for accessing a three dimensional model of an existing topography of a site;
  computer readable program code for receiving climatic and hydrological data for the site;
  computer readable program code for generating dimensions for one or more ephemeral channels using the three-dimensional model and the data; and
  computer readable program code for generating a graphical view of a proposed landform at the site using the existing topography, and the one or more proposed ephemeral channels.

* * * * *